United States Patent
Ekin et al.

(10) Patent No.: US 10,750,750 B2
(45) Date of Patent: *Aug. 25, 2020

(54) AQUEOUS COMPOSITIONS FOR TREATING SEEDS, SEEDS TREATED THEREWITH, AND METHODS FOR TREATING SEEDS

(71) Applicants: Covestro LLC, Pittsburgh, PA (US); Covestro Deutschland AG, Leverkusen (DE); Bayer CropScience LP, Research Triangle Park, NC (US)

(72) Inventors: Alan Ekin, Coraopolis, PA (US); James A. Thompson-Colon, Moon Township, PA (US); Timothy Pike, Bethel Park, PA (US); Scott Grace, Canonsburg, PA (US); Jinqi Li, Shanghai (CN); Sebastian Doerr, Duesseldorf (DE); Ronald Reichert, Cary, NC (US); William S. Hanson, Wake Forest, NC (US)

(73) Assignees: Covestro LLC, Pittsburgh, PA (US); Covestry Deutschland AG, Leverkusan (DE); Bayer CropScience LP, Research Triangle Park, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/206,719

(22) Filed: Jul. 11, 2016

(65) Prior Publication Data
US 2018/0007915 A1    Jan. 11, 2018

(51) Int. Cl.
| | | |
|---|---|---|
| A01N 63/00 | (2020.01) | |
| A01N 25/10 | (2006.01) | |
| A01N 43/40 | (2006.01) | |
| A01N 43/90 | (2006.01) | |
| A01N 51/00 | (2006.01) | |
| A01N 25/00 | (2006.01) | |
| A01N 47/40 | (2006.01) | |
| A01N 37/50 | (2006.01) | |
| A01N 43/653 | (2006.01) | |
| A01N 47/44 | (2006.01) | |

(52) U.S. Cl.
CPC ............ *A01N 63/00* (2013.01); *A01N 25/00* (2013.01); *A01N 25/10* (2013.01); *A01N 37/50* (2013.01); *A01N 43/40* (2013.01); *A01N 43/653* (2013.01); *A01N 43/90* (2013.01); *A01N 47/40* (2013.01); *A01N 47/44* (2013.01); *A01N 51/00* (2013.01)

(58) Field of Classification Search
CPC ........ A01N 63/00; A01N 47/44; A01N 37/50; A01N 43/653; A01N 25/10; A01N 43/40; A01N 43/90; A01N 51/00; A01N 25/00; A01N 47/40
See application file for complete search history.

(56) References Cited

U.S. PATENT DOCUMENTS

| | | | |
|---|---|---|---|
| 3,361,622 A | 1/1968 | Goodhue | |
| 6,071,973 A | 6/2000 | Vander Meer et al. | |
| 7,288,573 B2 | 10/2007 | Roe | |
| 7,872,036 B2 | 1/2011 | Toriyabe et al. | |
| 8,324,390 B2 | 12/2012 | Fischer et al. | |
| 8,470,856 B2 | 6/2013 | Koyanagi et al. | |
| 8,563,546 B2 | 10/2013 | Li et al. | |
| 9,073,866 B2 | 7/2015 | Kagabu et al. | |
| 2005/0129725 A1 | 6/2005 | Hino et al. | |
| 2006/0111242 A1* | 5/2006 | Muller | A01N 25/12 504/361 |
| 2007/0167565 A1 | 7/2007 | Rische et al. | |
| 2007/0207927 A1* | 9/2007 | Rosa | A01C 1/06 504/100 |
| 2008/0069785 A1 | 3/2008 | Jones | |
| 2009/0030146 A1* | 1/2009 | Berezkin | C08G 18/0823 524/591 |
| 2011/0039694 A1 | 2/2011 | Rosa et al. | |
| 2011/0189251 A1 | 8/2011 | Roe et al. | |
| 2011/0306639 A1 | 12/2011 | Qin et al. | |
| 2012/0202689 A1* | 8/2012 | Dorr | A01C 1/06 504/100 |
| 2013/0125451 A1 | 5/2013 | Brandt et al. | |
| 2014/0056956 A1 | 2/2014 | Jessop | |
| 2014/0274685 A1 | 9/2014 | Huang et al. | |
| 2015/0072857 A1 | 3/2015 | Reichert et al. | |
| 2015/0105398 A1 | 4/2015 | Mita et al. | |
| 2016/0272861 A1 | 9/2016 | Huang et al. | |

FOREIGN PATENT DOCUMENTS

| | | | |
|---|---|---|---|
| CN | 101337940 A | 1/2009 | |
| CN | 102057925 A | 5/2011 | |
| EP | 0010630 A1 | 5/1980 | |
| WO | WO 0117347 A1 * | 3/2001 | ............ A01N 25/10 |
| WO | 03/076415 A1 | 9/2003 | |
| WO | 03/106457 A1 | 12/2003 | |
| WO | 2004/099160 A1 | 11/2004 | |
| WO | 2006/003494 A2 | 1/2006 | |
| WO | 2008/134969 A1 | 11/2008 | |
| WO | 2009/002809 A2 | 12/2008 | |

(Continued)

OTHER PUBLICATIONS

Impranil DLN W 50, Product Datasheet [online]. Covestro, 2015 [retrieved on Jul. 5, 2017]. Retrieved from the Internet<URL:http://www.csc-jaekle.de/fileadmin/MeBl/110/MeBl_110228_EN.pdf>. pp. 1-4.*

(Continued)

*Primary Examiner* — Sue X Liu
*Assistant Examiner* — Andriae M Holt
(74) *Attorney, Agent, or Firm* — John E. Mrozinski, Jr.

(57) ABSTRACT

Disclosed are seed treatment compositions that include: (a) an aqueous polyurethane dispersion; and (b) an insecticide, a fungicide, a nematicide, and/or other pesticides. Also disclosed are seeds treated with such a treatment compositions and methods for treating a seed using such treatment composition.

11 Claims, No Drawings

(56) References Cited

FOREIGN PATENT DOCUMENTS

| WO | 2009/049851 A1 | 4/2009 |
|---|---|---|
| WO | 2009/080250 A2 | 7/2009 |
| WO | 2009/099929 A1 | 8/2009 |
| WO | 2010/129500 A2 | 11/2010 |
| WO | 2012/034472 A1 | 3/2012 |
| WO | 2014146145 A1 | 9/2014 |

OTHER PUBLICATIONS

Platzen, H., WO 01/17347, Seed Dressing Agent Formulations, Translations, pp. 1-12.*

Covestro Catalog, Imparnil Product Information Sheet, Catalog [online]. Covestro, 2015 [retrieved on Jun. 19, 2019]. Retrieved from the Internet:, 22 pages. (Year: 2015).*

Rieth, Joseph P. et al, Repelling Honeybees from Insecticide-Treated Flowers with 2-heptanone, Journal of Apicultural Research, 25(2), pp. 78-84 Coden: ISSN: 0021-8839, 1986.

Mayer, D.F. et al, Field evaluation of non-pesticide chemicals as honey bee, Colloques—Institut National De La Recherche Agronomique, 98(Hazards of Pesticdes to Bees), 159-168 Coden: Coliez; ISSN: 0293-1915, 2001.

Malerbo-Souza, Darclet Teresinha et al, Efficiency of n-octyl-acetate, 2-heptanone and citronellal in Repelling Bees from Basil (Ocimum sellowii—Labiatae), Brazilian Archives of Biology and Technology, 47(1), 121-125 Coden: BABTFC; ISSN: 1516-8913, 2004.

E. Innocent et al, Short Communication, Repellency property of long chain aliphatic methyl ketones against *Anopheles gambiae* s.s.,Tanzania Journal of Health Research (2008), vol. 10, No. 1, pp. 50-54.

M. Gupta, Olfactometric Evaluation of the Response of Apis florea F. to some Repellent Ketones, Zool JB Physiol, vol. 93, 1989, pp. 97-104, XP 9179501.

M. Gupta: Olfacto-Gustatory Response of Apis florea F. to Some Repellent Ketones, Zool JB Physiol, vol. 93, 1989, pp. 105-111, XP9179500.

W. Lwande et al, Constituents of Commiphora Rostrata and some of their analogues as *maize* weevil, *Sitophilus zeamais* repellants, Insect Sci Applic, vol. 13, No. 5, 1992, pp. 679-683, XP9179502.

\* cited by examiner

AQUEOUS COMPOSITIONS FOR TREATING SEEDS, SEEDS TREATED THEREWITH, AND METHODS FOR TREATING SEEDS

FIELD

The present invention relates to aqueous compositions for treating seeds that include a polyurethane dispersion, seeds treated therewith, and methods of treating seeds with such compositions.

BACKGROUND INFORMATION

Vacuum planters are often used to plant any of a variety of seeds, including seeds with odd shapes, such as corn seeds, pumpkin seeds, soybean seeds, among others. These planters have vertical plates with holes that are smaller than the seeds being planted. The planter draws a vacuum on the side of the plate opposite the container in which the seeds are stored. When the plate rotates through the storage container, atmospheric pressure holds seeds against the holes and allows the rotating plate to pick up seeds. As the plate rotates around past the seed tube, the vacuum is broken, allowing the seeds to drop down a seed tube.

A problem associated with the use of vacuum planters in particular is that, in some circumstances, they have a tendency to release a certain amount of seed dust during planting. This dust may include active ingredients, such as insecticides, nematicides, fungicides, and/or other pesticides that have been combined with the seed. The loss of such active ingredients during planting is undesirable. In some cases, therefore, a polymer binder is included with the active ingredients in the treatment of seeds to bind the active ingredient to the seed, thereby reducing the amount of dust generated during planting, particularly vacuum planting. Historically, this polymer binder has been a polyolefin, such as a carboxylated styrene/butadiene dispersion. Nevertheless, a certain amount of dust is still generated during the vacuum planting process even when seeds are treated in such a manner.

As a result, it would be desirable to provide seed treatments that significantly reduce the amount of seed dust generated during planting, such as vacuum planting. The present invention was made in view of the foregoing desire.

SUMMARY

In some respects, the present invention is directed to seed treatment compositions that comprise: (A) an aqueous polyurethane dispersion; and (B) an insecticide, a fungicide, a nematicide, and/or other pesticides. In these compositions, the aqueous polyurethane dispersion forms a film exhibiting: (a) a microhardness of no more than 15 N/mm$^2$, (b) a $T_g$ of −54° C. to −4° C., (c) a percent elongation of 44 to 820, and (d) a tensile strength of 130 lb/in$^2$ (0.9 megapascal (MPa)) to 1300 lb/in$^2$ (9.0 MPa).

The present invention is also directed to, among other things, seeds, such as, but not limited to, corn seeds, treated with such a treatment compositions and methods for treating a seed using such treatment compositions.

It is understood that the invention disclosed and described in this specification is not limited to the embodiments summarized in this Summary. The reader will appreciate the foregoing details, as well as others, upon considering the following detailed description of various non-limiting and non-exhaustive embodiments according to this specification.

DETAILED DESCRIPTION

Various embodiments are described and illustrated herein to provide an overall understanding of the structure, function, operation, manufacture, and use of the disclosed products and processes. The various embodiments described and illustrated herein are non-limiting and non-exhaustive. Thus, the invention is not limited by the description of the various non-limiting and non-exhaustive embodiments disclosed herein. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated herein by reference in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference herein to "certain embodiments", "some embodiments", "various non-limiting embodiments," or the like, means that a particular feature or characteristic may be included in an embodiment. Thus, use of such phrases, and similar phrases, herein does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments. Such modifications and variations are intended to be included within the scope of the present specification. In this manner, the various embodiments described in this specification are non-limiting and non-exhaustive.

In this specification, unless otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

As used herein, "polymer" encompasses prepolymers, oligomers and both homopolymers and copolymers; the prefix "poly" in this context referring to two or more. As used herein, "molecular weight", when used in reference to a polymer, refers to the number average molecular weight ("$M_n$"), unless otherwise specified. As used herein, the $M_n$ of a polymer containing functional groups, such as a polyol, can be calculated from the functional group number, such as hydroxyl number, which is determined by end-group analysis. As used herein, the term "binder" refers to a polymer, such as carboxylated styrene/butadiene, which is dispersed in water.

As used herein, the term "aliphatic" refers to organic compounds characterized by substituted or un-substituted straight, branched, and/or cyclic chain arrangements of constituent carbon atoms. Aliphatic compounds do not contain aromatic rings as part of the molecular structure thereof. As used herein, the term "cycloaliphatic" refers to organic compounds characterized by arrangement of carbon atoms in closed ring structures. Cycloaliphatic compounds do not contain aromatic rings as part of the molecular structure thereof. Therefore, cycloaliphatic compounds are a subset of aliphatic compounds. Therefore, the term "aliphatic" encompasses aliphatic compounds and/or cycloaliphatic compounds.

As used herein, "diisocyanate" refers to a compound containing two isocyanate groups. As used herein, "polyisocyanate" refers to a compound containing two or more isocyanate groups. Hence, diisocyanates are a subset of polyisocyanates.

As previously indicated, certain embodiments of the present invention are directed to seed treatment compositions. As used herein, the term "seed treatment composition" refers to a mixture of chemical components that will provide insecticidal, fungicidal, nematicidal, and/or other pesticidal properties when applied to the surface of a seed.

As indicated, the seed treatment compositions of the present invention comprise an aqueous polyurethane dispersion. As used herein, the term "aqueous polyurethane dispersion" means a dispersion of polyurethane particles in a continuous phase comprising water. As used herein, the term "polyurethane" refers to any polymer or oligomer comprising urethane (i.e., carbamate) groups, urea groups, or both. Thus, the term "polyurethane" as used herein refers collectively to polyurethanes, polyureas, and polymers containing both urethane and urea groups, unless otherwise indicated.

The aqueous polyurethane dispersion used in the compositions of the present invention is selected so as to form a film exhibiting: (a) a microhardness of no more than 15 N/mm$^2$, (b) a $T_g$ of –54° C. to –4° C., such as –54° C. to –35° C., (c) a percent elongation of 44 to 820, such as 250 to 700, and (d) a tensile strength of 130 lb/in$^2$ (0.9 megapascals (MPa)) to 1300 lb/in$^2$ (9.0 MPa), such as 130 lb/in$^2$ (0.9 MPa) to 1000 lb/in$^2$ (70.3 kg/cm$^2$/6.9 MPa) or 130 lb/in$^2$ (0.9 MPa) to 900 lb/in$^2$ (6.2 MPa). Microhardness, $T_g$, percent elongation, and tensile strength of a film formed from an aqueous polyurethane dispersion, for purposes of the present invention, are determined according to the methods that are described in the Examples below. It will be understood that the foregoing film properties refer to the film properties of a film formed from the aqueous polyurethane dispersion itself, which is thereafter used as a component in a seed treatment composition of the present invention, rather than the properties of a seed treatment composition itself. It has been surprisingly discovered that when an aqueous polyurethane dispersion (or mixture of two or more aqueous polyurethane dispersions) that forms a film exhibiting such properties is used in a seed treatment composition of the type described herein, the dust emissions may be reduced dramatically as compared to when an identical treatment composition is used in which a polyolefin latex, such as a carboxylated styrene/butadiene polymer, is used as the polymeric component of the composition rather than the aqueous polyurethane dispersion or as compared to an identical treatment composition in which no polymeric component is used in the composition, each of which being determined when comparing the same type of seed. The extent of such reduction in dust emission is described in more detail below.

In certain embodiments, the aqueous polyurethane dispersion that is used in the treatment compositions of the present invention comprises one or more polyurethanes that are the reaction product of reactants comprising, consisting essentially of, or, in some cases, consisting of: (i) a polyisocyanate; (ii) a polymeric polyol having a number average molecular weight ("$M_n$") of 400 to 8,000 g/mol; (iii) a compound comprising at least one isocyanate-reactive group and an anionic group or potentially anionic group; (iv) optionally a mono functional polyalkylene ether; (v) optionally a polyol having a molecular weight of less than <400 g/mol, and (vi) optionally a polyamine or amino alcohol having a molecular weight of from 32 to 400 g/mol; provided that the reactants and their respective amounts are selected so that a film formed from the polyurethane or mixture of polyurethanes exhibits: (a) a microhardness of no more than 15 N/mm$^2$, (b) a $T_g$ of –54° C. to –4° C., such as –54° C. to –35° C., (c) a percent elongation of 44 to 820, such as 250 to 700, and (d) a tensile strength of 130 lb/in$^2$ (0.9 megapascals (MPa)) to 1300 lb/in$^2$ (9.0 MPa), such as 130 lb/in$^2$ (0.9 MPa) to 1000 lb/in$^2$ (6.9 MPa) or 130 lb/in$^2$ (0.9 MPa) to 900 lb/in$^2$ (6.2 MPa).

Suitable polyisocyanates (i) include aromatic, araliphatic, aliphatic and cycloaliphatic polyisocyanates, such as, for example, 1,4-butylene diisocyanate, 1,6-hexamethylene diisocyanate (HDI), pentamethylene diisocyanate (PDI), isophorone diisocyanate (IPDI), 2,2,4- and/or 2,4,4-trimethylhexamethylene diisocyanate, the isomeric bis-(4,4'-isocyanatocyclohexyl)methanes or mixtures thereof of any desired isomer content, 1,4-cyclohexylene diisocyanate, 1,4-phenylene diisocyanate, 2,4- and/or 2,6-toluene diisocyanate or hydrogenated 2,4- and/or 2,6-toluene diisocyanate, 1,5-naphthalene diisocyanate, 2,4'- and/or 4,4'-diphenylmethane diisocyanate, 1,3- and 1,4-bis-(2-isocyanato-prop-2-yl)-benzene (TMXDI), 1,3-bis(isocyanatomethyl)benzene (XDI), (S)-alkyl 2,6-diisocyanato-hexanoates or (L)-alkyl 2,6-diisocyanatohexanoates.

Polyisocyanates having a functionality >2 can also be used if desired. Such polyisocyanates include modified diisocyanates having a uretdione, isocyanurate, urethane, allophanate, biuret, iminooxadiazinedione and/or oxadiazinetrione structure, as well as unmodified polyisocyanates having more than 2 NCO groups per molecule, for example 4-isocyanatomethyl-1,8-octane diisocyanate (nonane triisocyanate) or triphenylmethane-4,4',4''-triisocyanate.

In some embodiments of the present invention, polyisocyanates or polyisocyanate mixtures containing only aliphatically and/or cycloaliphatically bonded isocyanate groups are used that have a mean functionality of from 2 to 4, such as 2 to 2.6 or 2 to 2.4.

In certain embodiments, component (i) is used in an amount of at least 5% by weight, such as at least 10 or at least 20% by weight and/or no more than 60% by weight, such as no more than 50% or, in some cases, no more than 45% by weight, based on the total weight of reactants used to make the polyurethane.

Polymeric polyols (ii) have a molecular weight $M_n$ of from 400 to 8000 g/mol, such as 400 to 6000 g/mol or, in some cases, 500 to 3000 g/mol, 1000 to 3000 g/mol or 1500 to 3000 g/mol. In certain embodiments, these polymeric polyols have a hydroxyl number of from 20 to 400 mg KOH/g of substance, such as 20 to 300 mg KOH/g of substance, 20 to 200 mg KOH/g of substance or 20 to 100 mg KOH/g of substance. In certain embodiments, these polymeric polyols have a hydroxyl functionality of 1.5 to 6, such as 1.8 to 3 or 1.9 to 2.1. As will be appreciated, the $M_n$ of a polymer containing functional groups, such as a polyol, can, as discussed earlier, be calculated from the functional group number, such as hydroxyl number, which is determined by end-group analysis. "Hydroxyl number", as used herein, is determined according to DIN 53240.

Exemplary polymeric polyols include, for example, polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols, polyester polycarbonate polyols, phenol/formaldehyde resins, on their own or in mixtures.

Suitable polyether polyols include, for example, the polyaddition products of the styrene oxides, of ethylene oxide, propylene oxide, tetrahydrofuran, butylene oxide, epichlorohydrin, as well as their mixed-addition and graft products, as well as the polyether polyols obtained by condensation of polyhydric alcohols or mixtures thereof and those obtained by alkoxylation of polyhydric alcohols, amines and amino alcohols.

Suitable polyether polyols often have a hydroxyl functionality of 1.5 to 6.0, such as 1.8 to 3.0, a hydroxyl number of 20 to 700 mg KOH/g solid, such as 20 to 100, 20 to 50 or, in some cases 20 to 40 mg KOH/g solid, and/or a $M_n$ of 400 to 4000 g/mol, such as 100 to 4000 or 1000 to 3000 g/mol.

Exemplary polyester polyols are the polycondensation products of di- as well as optionally tri- and tetra-ols and di- as well as optionally tri- and tetra-carboxylic acids or hydroxycarboxylic acids or lactones. Instead of the free polycarboxylic acids it is also possible to use the corresponding polycarboxylic acid anhydrides or corresponding polycarboxylic acid esters of lower alcohols to prepare the polyesters. Examples of suitable diols are ethylene glycol, butylene glycol, diethylene glycol, triethylene glycol, polyalkylene glycols such as polyethylene glycol, further 1,2-propanediol, 1,3-propanediol, 1,3-butanediol, 1,4-butanediol, 1,6-hexanediol and isomers, 1,8-octanediol, neopentyl glycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A, tetrabromobisphenol A, lactone-modified diols, or hydroxypivalic acid neopentyl glycol ester. In order to achieve a functionality >2, polyols having a functionality of 3 can optionally be used proportionately, for example trimethylolpropane, glycerol, erythritol, pentaerythritol, trimethylolbenzene or trishydroxyethyl isocyanurate.

Suitable dicarboxylic acids are, for example, phthalic acid, isophthalic acid, terephthalic acid, tetrahydrophthalic acid, hexahydrophthalic acid, cyclohexane-dicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, and/or 2,2-dimethylsuccinic acid. Anhydrides of those acids can likewise be used, where they exist. Thus, for the purposes of the present invention, anhydrides are included in the expression "acid". Monocarboxylic acids, such as benzoic acid and hexanecarboxylic acid, can also be used, provided that the mean functionality of the polyol is ≥2. Saturated aliphatic or aromatic acids can be used, such as adipic acid or isophthalic acid. Trimellitic acid is a polycarboxylic acid which can also optionally be used.

Hydroxycarboxylic acids which can be used as reactants in the preparation of a polyester polyol having terminal hydroxyl groups are, for example, hydroxycaproic acid, hydroxybutyric acid, hydroxydecanoic acid, hydroxystearic acid and the like. Suitable lactones are, for example, ε-caprolactone, butyrolactone and their homologues.

In certain embodiments of the present invention, polymer polyol (ii) comprises or, in some cases, consists essentially of or consists of a polyester diol that is a reaction product of butanediol and/or neopentyl glycol and/or hexanediol and/or ethylene glycol and/or diethylene glycol with adipic acid and/or phthalic acid and/or isophthalic acid, such as polyester polyols that are a reaction product of butanediol and/or neopentyl glycol and/or hexanediol with adipic acid and/or phthalic acid.

Suitable polyester polyols, such as the foregoing polyester diols, often have a hydroxyl functionality of 1.5 to 6.0, such as 1.8 to 3.0, a hydroxyl number of 20 to 700 mg KOH/g solid, such as 20 to 100, 20 to 80 or, in some cases 40 to 80 mg KOH/g solid, and/or a $M_n$ of 500 to 3000 g/mol, such as 600 to 2500 g/mol.

Exemplary polycarbonate polyols are obtainable by reaction of carbonic acid derivatives, for example diphenyl carbonate, dimethyl carbonate or phosgene, with diols. Suitable diols include the diols mentioned earlier with respect to the preparation of polyester polyols. In some cases, the diol component contains from 40 to 100 wt. % 1,6-hexanediol and/or hexanediol derivatives, often containing ether or ester groups in addition to terminal OH groups, for example products which are obtained by reaction of one mole of hexanediol with at least one mole, preferably from one to two moles, of ε-caprolactone or by etherification of hexanediol with itself to form di- or tri-hexylene glycol. Polyether polycarbonate polyols can also be used.

In certain embodiments, component (ii) is used in an amount of at least 20% by weight, such as at least 30 or at least 40% by weight and/or no more than 80% by weight, such as no more than 70% by weight, based on the total weight of reactants used to make the polyurethane.

Component (iii) is a compound comprising at least one isocyanate-reactive group and an anionic group or potentially anionic group. Exemplary such compounds are those which contain, for example, carboxylate, sulfonate, phosphonate groups or groups which can be converted into the above-mentioned groups by salt formation (potentially anionic groups), and which can be incorporated into the macromolecules by isocyanate-reactive groups, such as hydroxyl or amine groups, that are present.

Suitable anionic or potentially anionic compounds (iii) are, for example, mono- and di-hydroxycarboxylic acids, mono- and di-aminocarboxylic acids, mono- and di-hydroxysulfonic acids, mono- and di-aminosulfonic acids as well as mono- and di-hydroxyphosphonic acids or mono- and di-aminophosphonic acids and their salts, such as dimethylolpropionic acid, dimethylolbutyric acid, hydroxypivalic acid, N-(2-aminoethyl)-β-alanine, 2-(2-amino-ethylamino)-ethanesulfonic acid, ethylene-diamine-propyl- or -butyl-sulfonic acid, 1,2- or 1,3-propylenediamine-3-ethylsulfonic acid, malic acid, citric acid, glycolic acid, lactic acid. In certain embodiments, the anionic or potentially anionic compounds have carboxy or carboxylate and/or sulfonate groups and have a functionality of from 1.9 to 2.1, such as the salts of 2-(2-amino-ethylamino)ethanesulfonic acid.

In certain embodiments, component (iii) is used in an amount of at least 0.1% by weight, such as at least 1, or at least 3% by weight and/or no more than 10% by weight, such as no more than 7% by weight, based on the total weight of reactants used to make the polyurethane.

Optional component (iv) is a mono functional polyalkylene ether that contains at least one, in some cases one, hydroxy or amino group. In some embodiments, component (iv) comprises a compound of the formula:

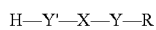

H—Y'—X—Y—R in which R is a monovalent hydrocarbon radical having 1 to 12 carbon atoms, such as an unsubstituted alkyl radical having 1 to 4 carbon atoms; X is a polyalkylene oxide chain having 5 to 90, such as 20 to 70 chain members, which may comprise at least 40%, such as at least 65%, ethylene oxide units and which in addition to ethylene oxide units may comprise propylene oxide, butylene oxide and/or styrene oxide units; and Y and Y' are each independently oxygen or —NR'— in which R' is H or R, in which R is defined above.

Mono functional polyalkylene ethers suitable for use in component (iv) may, in some cases, contain 7 to 55 ethylene oxide units per molecule, and can be obtained by alkoxylation of suitable starter molecules, such as, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methyl-cyclohexanols or hydroxymethylcyclohexane, 3-ethyl-3-hydroxymethyloxetan or tetrahydrofurfuryl alcohol; diethylene glycol monoalkyl ethers, such as, for example, diethylene glycol monobutyl ether; unsaturated alcohols, such as allyl alcohol, 1,1-dimethylallyl alcohol or oleic alcohol; aromatic alcohols, such as phenol, the isomeric cresols or methoxyphenols; araliphatic alcohols, such as benzyl alcohol, anis alcohol or cinnamic alcohol; secondary monoamines, such as dimethylamine, diethylamine, dipropylamine, diisopropylamine, dibutylamine, bis-(2-ethylhexyl)-amine, N-methyl- and N-ethyl-cyclohexylamine or dicyclohexylamine; as well as heterocyclic secondary amines, such as morpholine, pyrrolidine, piperidine or 1H-pyrazole, including mixtures of two or more of any of the foregoing.

Alkylene oxides suitable for the alkoxylation reaction include, for example, ethylene oxide and propylene oxide, which can be used in the alkoxylation reaction in any desired sequence or alternatively in admixture. In some embodiments, component (iv) comprises a copolymer of ethylene oxide with propylene oxide that contains ethylene oxide in an amount of at least 40% by weight, such as at least 50% by weight, at least 60% by weight or at least 65% by weight and/or up to 90% by weight or up to 80% by weight, based on the total weight of ethylene oxide and propylene oxide. In certain embodiments, the $M_n$ of such a copolymer is 300 g/mol to 6000 g/mol, such as 500 g/mol to 4000 g/mol, such as 1000 g/mol to 3000 g/mol.

In certain embodiments, component (iv) is used in an amount of at least 1% by weight, such as at least 5, or at least 10% by weight and/or no more than 30% by weight, such as no more than 20% by weight, based on the total weight of reactants used to make the polyurethane.

Optional component (v) comprises a polyol having a molecular weight of less than <400 grams/mole. Examples of such polyols include, without limitation, the diols mentioned earlier with respect to the preparation of polyester polyols. In some cases, the polyol having a molecular weight of less than <400 g/mol has up to 20 carbon atoms, such as is the case with, for example, ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, neopentyl glycol, hydroquinone dihydroxyethyl ether, bisphenol A (2,2-bis(4-hydroxyphenyl)propane), hydrogenated bisphenol A, (2,2-bis(4-hydroxycyclohexyl)propane), trimethylolpropane, glycerol, pentaerythritol and also any desired mixtures of two or more thereof. Also suitable are ester diols of the specified molecular weight range such as α-hydroxybutyl-ε-hydroxycaproic acid ester, ω-hydroxyhexyl-γ-hydroxybutyric acid ester, β-hydroxyethyl adipate or bis(β-hydroxyethyl) terephthalate.

In certain embodiments, component (v) is used in an amount of at least 1% by weight, such as at least 2, or at least 3% by weight and/or no more than 20% by weight, such as no more than 10 or no more than 5% by weight, based on the total weight of reactants used to make the polyurethane.

Optional component (vi) is used for chain extension and includes di- or poly-amines as well as hydrazides, for example ethylenediamine, 1,2- and 1,3-diaminopropane, 1,4-diaminobutane, 1,6-diaminohexane, isophoronediamine, isomer mixture of 2,2,4- and 2,4,4-trimethyl-hexamethylenediamine, 2-methyl-pentamethylenediamine, diethylenetriamine, 1,3- and 1,4-xylylenediamine, α,α,α',α'-tetramethyl-1,3- and -1,4-xylylenediamine and 4,4-diaminodicyclohexylmethane, dimethylethylenediamine, hydrazine or adipic acid dihydrazide. Also suitable for use are compounds which contain active hydrogen of different reactivity towards NCO groups, such as compounds which contain, in addition to a primary amino group, also secondary amino groups or, in addition to an amino group (primary or secondary), also OH groups. Examples thereof are primary/secondary amines, such as 3-amino-1-methyl-amino-propane, 3-amino-1-ethylaminopropane, 3-amino-1-cyclohexylaminopropane, 3-amino-1-methylaminobutane, also alkanolamines such as N-aminoethylethanol-amine, ethanolamine, 3-aminopropanol or neopentanolamine.

In certain embodiments, component (vi) is used in an amount of at least 1% by weight, such as at least 3 or at least 5% by weight and/or no more than 10% by weight, such as no more than 8 or, in some cases, no more than 7% by weight, based on the total weight of reactants used to make the polyurethane.

In some embodiments, the sum of components (i)-(vi) is 100 percent by weight, based on the total weight of the reactants used to make the polyurethane.

Any of a variety of processes can be used to prepare the aqueous polyurethane dispersions used in embodiments of the present invention, such as the prepolymer mixing method, acetone method or melt dispersing method, each of which will be understood by a person skilled in the art of making aqueous polyurethane dispersions. For example, in some embodiments, one or more aqueous polyurethane dispersion included in the compositions of the present invention may be produced by the acetone method, such as is described, for example, in U.S. Patent Application Publication No. 2007/0167565 A1 at [0057]-[0073], the cited portion of which being incorporated herein by reference.

In certain embodiments, the resin solids content of the aqueous polyurethane dispersions prepared by any of these methods is at least 20% by weight, such as at least 25 or at least 30% by weight and/or no more than 65% by weight, such as no more than 50 or no more than 45% by weight, based on the total weight of the dispersion.

As indicated above, in the seed treatment compositions of the present invention the aqueous polyurethane dispersion forms a film that exhibits: (a) a microhardness of no more than 15 N/mm$^2$, (b) a $T_g$ of $-54°$ C. to $-4°$ C., such as $-54°$ C. to $-35°$ C., (c) a percent elongation of 44 to 820, such as 250 to 700, and (d) a tensile strength of 130 lb/in$^2$ (0.9 megapascals (MPa)) to 1300 lb/in$^2$ (9.0 MPa), such as 130 lb/in$^2$ (0.9 MPa) to 1000 lb/in$^2$ (6.9 MPa) or 130 lb/in$^2$ (0.9 MPa) to 900 lb/in$^2$ (6.2 MPa).

Aqueous polyurethane dispersions that are suitable for use in the treatment compositions of the present invention are commercially available and include, for example, (A) BAYBOND PU 330 (Covestro LLC), which is an anionic/nonionic polyester polyurethane dispersed in water and is a reaction product of components (i), (ii), (iii), and (iv) described above. In certain embodiments, such an aqueous polyurethane dispersion is used in combination with a different aqueous polyurethane dispersion, such as, for example, (B) IMPRANIL DL 2611 (Covestro LLC), which is an anionic aliphatic polyester-polyurethane dispersion and is a reaction product of components (i), (ii), (iii), (v), and (vi) described above and/or BAYHYDROL UH XP 2719 (Covestro LLC) which is an aliphatic, polyester-based, anionic polyurethane dispersion that is different from IMPRANIL DL 2611. In certain embodiments using a blend of dispersions such as those described above, the weight ratio of the aqueous polyurethane dispersions in the seed treatment compositions of the present invention is (A)/(B+C) is at least 1:1, such as at least 2:1.

In certain embodiments, the aqueous polyurethane dispersion is present in the seed treatment composition in an amount such that the total amount of polyurethane that is present in the seed treatment composition in some embodiments as an amount of 1% to 25%, in some embodiments from 2% to 20%, in some embodiments from 3% to 15%, in some embodiments from about 4% to 10%, in some embodiments at least 3%, in some embodiments at least 5%, in some embodiments no more than 25%, in some embodiments no more than 20%, in some embodiments no more than 15% and in some embodiments no more than 10%.

The seed treatment compositions of the present invention may further include any of a variety of coating additives such as defoamers, devolatilizers, thickeners, flow control additives, colorants (including pigments and dyes), surfactants, dispersants, neutralizers, biological materials (such as inoculants), nutrients, micronutrients, or surface additives.

As indicated earlier, the seed treatment compositions of the present invention comprise an insecticide, a fungicide, a nematicide, and/or other pesticides. In various embodiments, the seed treatment composition comprises an insecticide. The present invention is not limited to a particular insecticide. Suitable insecticides include, but are not limited to:

(1) Acetylcholinesterase (AChE) inhibitors, such as, for example, carbamates, for example alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb; or organophosphates, for example acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(2) GABA-gated chloride channel antagonists, such as, for example, cyclodiene-organochlorines, for example chlordane and endosulfan or phenylpyrazoles (fiproles), for example ethiprole and fipronil.

(3) Sodium channel modulators/voltage-gated sodium channel blockers such as, for example, pyrethroids, e.g. acrinathrin, allethrin, d-cis-trans allethrin, d-trans allethrin, bifenthrin, bioallethrin, bioallethrin s-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomer], deltamethrin, empenthrin [(EZ)-(1R)-isomer], esfenvalerate, etofenprox, fenpropathrin, fenvalerate, flucythrinate, flumethrin, tau-fluvalinate, halfenprox, imiprothrin, kadethrin, permethrin, phenothrin [(1R)-trans-isomer], prallethrin, pyrethrins (pyrethrum), resmethrin, silafluofen, tefluthrin, tetramethrin, tetramethrin [(1R)-isomer)], tralomethrin and transfluthrin or DDT or methoxychlor.

(4) Nicotinergic acetylcholine receptor (nAChR) agonists, such as, for example, neonicotinoids, e.g. acetamiprid, clothianidin, dinotefuran, imidacloprid, nitenpyram, thiacloprid and thiamethoxam or nicotine or sulfoxaflor.

(5) Allosteric activators of the nicotinergic acetylcholine receptor (nAChR) such as, for example, spinosyns, e.g. spinetoram and spinosad.

(6) Chloride channel activators, such as, for example, avermectins/milbemycins, for example abamectin, emamectin benzoate, lepimectin and milbemectin.

(7) Juvenile hormone imitators such as, for example, juvenile hormone analogues, e.g. hydroprene, kinoprene and methoprene or fenoxycarb or pyriproxyfen.

(8) Active compounds with unknown or nonspecific mechanisms of action such as, for example, alkyl halides, e.g. methyl bromide and other alkyl halides; or chloropicrine or sulphuryl fluoride or borax or tartar emetic.

(9) Selective antifeedants, for example pymetrozine or flonicamid.

(10) Mite growth inhibitors, for example clofentezine, hexythiazox and diflovidazin or etoxazole.

(11) Microbial disruptors of the insect gut membrane, for example *Bacillus thuringiensis* subspecies *israelensis, Bacillus sphaericus, Bacillus thuringiensis* subspecies *aizawai, Bacillus thuringiensis* subspecies *kurstaki, Bacillus thuringiensis* subspecies *tenebrionis,* and BT plant proteins: Cry1Ab, Cry1Ac, Cry1Fa, Cry2Ab, mCry3A, Cry3Ab, Cry3Bb, Cry34/35Ab1.

(12) Oxidative phosphorylation inhibitors, ATP disruptors such as, for example, diafenthiuron or organotin compounds, for example azocyclotin, cyhexatin and fenbutatin oxide or propargite or tetradifon;

(13) Oxidative phosphorylation decouplers acting by interrupting the H proton gradient such as, for example, chlorfenapyr, DNOC and sulfluramid.

(14) Nicotinergic acetylcholine receptor antagonists such as, for example, bensultap, cartap hydrochloride, thiocylam, and thiosultap-sodium.

(15) Chitin biosynthesis inhibitors, type 0, such as, for example, bistrifluron, chlorfluazuron, diflubenzuron, flucycloxuron, flufenoxuron, hexaflumuron, lufenuron, novaluron, novifluron, teflubenzuron and triflumuron.

(16) Chitin biosynthesis inhibitors, type 1, for example buprofezin.

(17) Moulting inhibitors (in particular for Diptera, i.e. dipterans) such as, for example, cyromazine.

(18) Ecdysone receptor agonists such as, for example, chromafenozide, halofenozide, methoxyfenozide and tebufenozide.

(19) Octopaminergic agonists such as, for example, amitraz.

(20) Complex-III electron transport inhibitors such as, for example, hydramethylnone or acequinocyl or fluacrypyrim.

(21) Complex-I electron transport inhibitors, for example from the group of the METI acaricides, e.g. fenazaquin, fenpyroximate, pyrimidifen, pyridaben, tebufenpyrad and tolfenpyrad or rotenone (Derris).

(22) Voltage-gated sodium channel blockers, for example indoxacarb or metaflumizone.

(23) Inhibitors of acetyl-CoA carboxylase such as, for example, tetronic and tetramic acid derivatives, e.g. spirodiclofen, spiromesifen and spirotetramat.

(24) Complex-IV electron transport inhibitors such as, for example, phosphines, e.g. aluminium phosphide, calcium phosphide, phosphine and zinc phosphide or cyanide.

(25) Complex II electron transport inhibitors, such as, for example, cyenopyrafen and cyflumetofen.

(26) Ryanodine receptor effectors, such as, for example, diamides, e.g. chlorantraniliprole, cyantraniliprole and flubendiamide.

(27) Other active compounds such as, for example, afidopyropen, azadirachtin, benclothiaz, benzoximate, bifenazate, bromopropylate, chinomethionat, cryolite, dicofol, diflovidazin, fluensulfone, flometoquin, flufenerim, flufenoxystrobin, flufiprole, fluopyram, flupyradifurone, fufenozide, heptafluthrin, imidaclothiz, iprodione, meperfluthrin, paichongding, pyflubumide, pyrifluquinazon, pyriminostrobin, tetramethylfluthrin and iodomethane; furthermore preparations based on *Bacillus firmus* (I-1582, BioNeem, Votivo), and also the following compounds: 3-bromo-N-{2-bromo-4-chloro-6-[(1-cyclopropylethyl)carbamoyl]phenyl}-1-(3-chloropyridin-2-yl)-1H-pyrazole-5-carboxamide (known from WO2005/077934) and 1-{2-fluoro-4-methyl-5-[(2,2,2-trifluoroethyl)sulphinyl]phenyl}-3-(trifluoromethyl)-1H-1,2,4-triazole-5-amine (known from WO2006/043635), {1'-[(2E)-3-(4-chlorophenyl)prop-2-en-1-yl]-5-fluorospiro[indol-3,4'-piperidin]-1(2H)-yl}(2-chloropyridin-4-yl)methanone (known from WO2003/106457), 2-chloro-N-[2-{1-[(2E)-3-(4-chlorophenyl)prop-2-en-1-yl]piperidin-4-yl}-4-(trifluoromethyl)phenyl] isonicotinamide (known from WO2006/003494), 3-(2,5-dimethylphenyl)-4-hydroxy-8-methoxy-1,8-diazaspiro[4.5]dec-3-en-2-one (known from WO2009/049851), 3-(2,5-dimethylphenyl)-8-methoxy-2-oxo-1,8-diazaspiro[4.5]dec-3-en-4-yl-ethylcarbonate (known from WO2009/049851), 4-(but-2-yn-1-yloxy)-6-(3,5-dimethylpiperidin-1-yl)-5-fluoropyrimidine (known from WO2004/099160), 4-(but-2-yn-1-yloxy)-6-(3-chlorophenyl)pyrimidine (known from WO2003/076415), PF1364 (CAS Reg. No. 1204776-60-2), 4-[5-(3,5-dichlorophenyl)-5-(trifluoromethyl)-4,5-dihydro-1,2-oxazol-3-yl]-2-methyl-N-{2-oxo-2-[(2,2,2-trifluoroethyl)amino]ethyl}benzamide (known from WO2005/085216), 4-{5-[3-chloro-5-(trifluoromethyl)phenyl]-5-(trifluoromethyl)-4,5-dihydro-1,2-oxazol-3-yl}-N-{2-oxo-2-[(2,2,2-trifluoroethyl)amino]ethyl}-1-naphthamide (known from WO2009/002809), methyl 2-[2-({[3-bromo-1-(3-chloropyridin-2-yl)-1H-pyrazol-5-yl]carbonyl}amino)-5-chloro-3-methylbenzoyl]-2-methylhydrazinecarboxylate (known from WO2005/085216), methyl 2-[2-({[3-bromo-1-(3-chloropyridin-2-yl)-1H-pyrazol-5-yl]carbonyl}amino)-5-cyano-3-methylbenzoyl]-2-ethylhydrazinecarboxylate (known from WO2005/085216), methyl 2-[2-({[3-bromo-1-(3-chloropyridin-2-yl)-1H-pyrazol-5-yl]carbonyl}amino)-5-cyano-3-methylbenzoyl]-2-methylhydrazinecarboxylate (known from WO2005/085216), methyl 2-[3,5-dibromo-2-({[3-bromo-1-(3-chloropyridin-2-yl)-1H-pyrazol-5-yl]-carbonyl}amino)benzoyl]-2-ethylhydrazinecarboxylate (known from WO2005/085216), 1-(3-chloropyridin-2-yl)-N-[4-cyano-2-methyl-6-(methyl-carbamoyl)phenyl]-3-{[5-(trifluoromethyl)-2H-tetrazol-2-yl]methyl}-1H-pyrazole-5-carboxamide (known from WO2010/069502), N-[2-(5-amino-1,3,4-thiadiazol-2-yl)-4-chloro-6-methylphenyl]-3-bromo-1-(3-chloropyridin-2-yl)-1H-pyrazole-5-carboxamide (known from CN102057925), 3-chloro-N-(2-cyanopropan-2-yl)-N-[4-(1,1,1,2,3,3,3-heptafluoropropan-2-yl)-2-methylphenyl]phthalamide (known from WO2012/034472), 8-chloro-N-[(2-chloro-5-methoxyphenyl)sulphonyl]-6-(trifluoromethyl)imidazo[1,2-a]pyridine-2-carboxamide (known from WO2010/129500), 4-[5-(3,5-dichlorophenyl)-5-(trifluoromethyl)-4,5-dihydro-1,2-oxazol-3-yl]-2-methyl-N-(1-oxidothietan-3-yl)benzamide (known from WO2009/080250), N-[(2E)-1-[(6-chloropyridin-3-yl)methyl]pyridin-2(1H)-ylidene]-2,2,2-trifluoroacetamide (known from WO2012/029672), 1-[(2-chloro-1,3- thiazol-5-yl)methyl]-4-oxo-3-phenyl-4H-pyrido[1,2-a]pyrimidin-1-ium-2-olate (known from WO2009/099929), 1-[(6-chloropyridin-3-yl)methyl]-4-oxo-3-phenyl-4H-pyrido[1,2-a]pyrimidin-1-ium-2-olate (known from WO2009/099929), (5S,8R)-1-[(6-chloropyridin-3-yl)methyl]-9-nitro-2,3,5,6,7,8-hexahydro-1H-5,8-epoxyimidazo[1,2-a]azepine (known from WO2010/069266), (2E)-1-[(6-chloropyridin-3-yl)methyl]-N'-nitro-2-pentylidenehydrazinecarboximidamide (known from WO2010/060231), 4-(3-{2,6-dichloro-4-[(3,3-dichloro-prop-2-en-1-yl)oxy]phenoxy}propoxy)-2-methoxy-6-(trifluoromethyl)pyrimidine (known from CN101337940), N-[2-(tert-butylcarbamoyl)-4-chloro-6-methylphenyl]-1-(3-chloropyridin-2-yl)-3-(fluoromethoxy)-1H-pyrazole-5-carboxamide (known from WO2008/134969).

In some cases, the seed treatment composition comprises a fungicide. Suitable fungicides include, but are not limited to:

(1) Inhibitors of ergosterol biosynthesis such as, for example, aldimorph, azaconazole, bitertanol, bromuconazole, cyproconazole, diclobutrazole, difenoconazole, diniconazole, diniconazole-M, dodemorph, dodemorph acetate, epoxiconazole, etaconazole, fenarimol, fenbuconazole, fenhexamid, fenpropidin, fenpropimorph, fluquinconazole, flurprimidol, flusilazole, flutriafole, furconazole, furconazole-cis, hexaconazole, imazalil, imazalil sulphate, imibenconazole, ipconazole, metconazole, myclobutanil, naftifin, nuarimol, oxpoconazole, paclobutrazole, pefurazoate, penconazole, piperalin, prochloraz, propiconazole, prothioconazole, pyributicarb, pyrifenox, quinconazole, simeconazole, spiroxamine, tebuconazole, terbinafin, tetraconazole, triadimefon, triadimenol, tridemorph, triflumizole, triforine, triticonazole, uniconazole, uniconazole-P, viniconazole, voriconazole, 1-(4-chlorophenyl)-2-(1H-1,2,4-triazol-1-yl)cycloheptanol, methyl 1-(2,2-dimethyl-2,3-dihydro-1H-inden-1-yl)-1H-imidazole-5-carboxylate, N'-{5-(difluoromethyl)-2-methyl-4-[3-(trimethylsilyl)propoxy]phenyl}-N-ethyl-N-methylimidoformamide, N-ethyl-N-methyl-N'-{2-methyl-5-(trifluoromethyl)-4-[3-(trimethylsilyl)propoxy]-phenyl}imidoformamide, O-[1-(4-methoxyphenoxy)-3,3-dimethylbutan-2-yl]-1H-imidazole-1-carbothioate, and pyrisoxazole.

(2) Respiration inhibitors (respiratory chain inhibitors) such as, for example, bixafen, boscalid, carboxin, diflumetorim, fenfuram, fluopyram, flutolanil, fluxapyroxad, furametpyr, furmecyclox, isopyrazam mixture of the syn-epimeric racemate 1RS,4SR,9RS and the anti-empimeric racemate 1RS,4SR,9SR, isopyrazam (anti-epimeric racemate), isopyrazam (anti-epimeric enantiomer 1R,4S,9S), isopyrazam (anti-epimeric enantiomer 1S,4R,9R), isopyrazam (syn-epimeric racemate 1RS,4SR,9RS), isopyrazam (syn-epimeric enantiomer 1R,4S,9R), isopyrazam (syn-epimeric enantiomer 1S,4R,9S), mepronil, oxycarboxin, penflufen, penthiopyrad, sedaxane, thifluzamide, 1-methyl-N-[2-(1,1,2,2-tetrafluoroethoxy)phenyl]-3-(trifluoromethyl)-1H-pyrazole-4-carboxamide, 3-(difluoromethyl)-1-methyl-N-[2-(1,1,2,2-tetrafluoro-ethoxy)phenyl]-1H-pyrazole-4-carboxamide, 3-(difluoromethyl)-N-[4-fluoro-2-(1,1,2,3,3,3-hexafluoropropoxy)phenyl]-1-methyl-1H-pyrazole-4-carboxamide, N-[1-(2,4-dichlorophenyl)-1-methoxypropan-2-yl]-3-(difluoromethyl)-1-methyl-1H-pyrazole-4-carboxamide, 5,8-difluoro-N-[2-(2-fluoro-4-{[4-(trifluoromethyl)pyridin-2-yl]oxy}phenyl)ethyl]quinazoline-4-amine, benzovindiflupyr, N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide and N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide, 3-(difluoromethyl)-1-methyl-N-(1,1,3-trimethyl-2,3-dihydro-1H-inden-4-yl)-1H-pyrazole-4-carboxamide, 1,3,5-trimethyl-N-(1,1,3-trimethyl-2,3-dihydro-1H-inden-4-yl)-1H-pyrazole-4-carboxamide, 1-methyl-3-(trifluoromethyl)-N-(1,1,3-trimethyl-2,3-dihydro-1H-inden-4-yl)-1H-pyrazole-4-carboxamide, 1-methyl-3-(trifluoromethyl)-N-[(3R)-1,1,3-trimethyl-2,3-dihydro-1H-inden-4-yl]-1H-pyrazole-4-carboxamide, 1-methyl-3-(trifluoromethyl)-N-[(3S)-1,1,3-trimethyl-2,3-dihydro-1H-inden-4-yl]-1H-pyrazole-4-carboxamide, 3-(difluoromethyl)-1-methyl-N-[(3S)-1,1,3-trimethyl-2,3-dihydro-1H-inden-4-yl]-1H-pyrazole-4-carboxamide, 3-(difluoromethyl)-1-methyl-N-[(3R)-1,1,3-trimethyl-2,3-dihydro-1H-inden-4-yl]-1H-pyrazole-4-carboxamide, 1,3,5-trimethyl-N-[(3R)-1,1,3-trimethyl-2,3-dihydro-1H-inden-4-yl]-1H-pyrazole-4-carboxamide, 1,3,5-trimethyl-N-[(3S)-1,1,3-trimethyl-2,3-dihydro-1H-inden-4-yl]-1H-pyrazole-4-carboxamide, benodanil, 2-chloro-N-(1,1,3-trimethyl-2,3-dihydro-1H-inden-4-yl)pyridine-3-carboxamide, isofetamid.

(3) Respiration inhibitors (respiratory chain inhibitors) acting on complex III of the respiratory chain such as, for example, ametoctradin, amisulbrom, azoxystrobin, cyazofamid, coumethoxystrobin, coumoxystrobin, dimoxystrobin, enestroburin, famoxadone, fenamidone, flufenoxystrobin, fluoxastrobin, kresoxim-methyl, metominostrobin, orysastrobin, picoxystrobin, pyraclostrobin, pyrametostrobin, pyraoxystrobin, pyribencarb, triclopyricarb, trifloxystrobin, (2E)-2-(2-{[6-(3-chloro-2-methylphenoxy)-5-fluoropyrimidin-4-yl]oxy}phenyl)-2-(methoxyimino)-N-methylethanamide, (2E)-2-(methoxyimino)-N-methyl-2-(2-{[({(1E)-1-[3-(trifluoromethyl)phenyl]ethylidene}amino)-oxy]methyl}phenyl)ethanamide, (2E)-2-(methoxyimino)-N-methyl-2-{2-[(E)-({1-[3-(trifluoromethyl)phenyl]ethoxy}imino)methyl]phenyl}ethanamide, (2E)-2-{2-[({[(1E)-1-(3-{[(E)-1-fluoro-2-phenylethenyl]oxy}phenyl)-ethylidene]-amino}oxy)methyl]phenyl}-2-(methoxyimino)-N-methylethanamide, (2E)-2-{2-[({[(2E,3E)-4-(2,6-dichlorophenyl)but-3-en-2-ylidene]amino}oxy)-methyl]phenyl}-2-(methoxyimino)-N-methylethanamide, 2-chloro-N-(1,1,3-trimethyl-2,3-dihydro-1H-inden-4-yl)pyridine-3-carboxamide, 5-methoxy-2-methyl-4-(2-{[({(1E)-1-[3-(trifluoromethyl)phenyl]ethylidene}amino)-oxy]methyl}phenyl)-2,4-dihydro-3H-1,2,4-triazol-3-one, methyl (2E)-2-{2-[({cyclopropyl[(4-methoxyphenyl)imino]methyl}sulphanyl)methyl]phenyl}-3-methoxyprop-2-enoate, N-(3-ethyl-3,5,5-trimethylcyclohexyl)-3-(formylamino)-2-hydroxybenzamide, 2-{2-[(2,5-dimethylphenoxy)methyl]phenyl}-2-methoxy-N-methylacetamide.

(4) Inhibitors of mitosis and cell division such as, for example, benomyl, carbendazim, chlorfenazole, diethofencarb, ethaboxam, fluopicolid, fuberidazole, pencycuron, thiabendazole, thiophanate-methyl, thiophanate, zoxamide, 5-chloro-7-(4-methylpiperidin-1-yl)-6-(2,4,6-trifluorophenyl)-[1,2,4]triazolo[1,5-a]pyrimidine and 3-chloro-5-(6-chloropyridin-3-yl)-6-methyl-4-(2,4,6-trifluorophenyl)pyridazine.

(5) Compounds having multisite activity such as, for example, Bordeaux mixture, captafol, captan, chlorothalonil, copper preparations such as copper hydroxide, copper naphthenate, copper oxide, copper oxychloride, copper sulphate, dichlofluanid, dithianon, dodine, dodine free base, ferbam, fluorfolpet, folpet, guazatine, guazatine acetate, iminoctadine, iminoctadine albesilate, iminoctadine triacetate, mancopper, mancozeb, maneb, metiram, zinc metiram, copper-oxine, propamidine, propineb, sulphur and sulphur preparations such as, for example calcium polysulphide, thiram, tolylfluanid, zineb, ziram and anilazine.

(6) Resistance inducers such as, for example, acibenzolar-S-methyl, isotianil, probenazole, tiadinil and laminarin.

(7) Inhibitors of amino acid and protein biosynthesis such as, for example, blasticidin-S, cyprodinil, kasugamycin, kasugamycin hydrochloride hydrate, mepanipyrim, pyrimethanil, 3-(5-fluoro-3,3,4,4-tetramethyl-3,4-dihydroisoquinolin-1-yl)quinolone, oxytetracycline and streptomycin.

(8) ATP production inhibitors such as, for example, fentin acetate, fentin chloride, fentin hydroxide and silthiofam.

(9) Inhibitors of cell wall synthesis such as, for example, benthiavalicarb, dimethomorph, flumorph, iprovalicarb, mandipropamid, polyoxins, polyoxorim, validamycin A, valifenalate and polyoxin B.

(10) Inhibitors of lipid and membrane synthesis such as, for example, biphenyl, chlorneb, dicloran, edifenphos, etridiazole, iodocarb, iprobenfos, isoprothiolane, propamocarb, propamocarb hydrochloride, prothiocarb, pyrazophos, quintozene, tecnazene and tolclofos-methyl.

(11) Melanin biosynthesis inhibitors, for example carpropamid, diclocymet, fenoxanil, fthalide, pyroquilon, tricyclazole and 2,2,2-trifluoroethyl {3-methyl-1-[(4-methylbenzoyl)amino]butan-2-yl}carbamate.

(12) Inhibitors of nucleic acid synthesis such as, for example, benalaxyl, benalaxyl-M (kiralaxyl), bupirimate, clozylacon, dimethirimol, ethirimol, furalaxyl, hymexazole, metalaxyl, metalaxyl-M (mefenoxam), ofurace, oxadixyl, oxolinic acid and octhilinone.

(13) Signal transduction inhibitors such as, for example, chlozolinate, fenpiclonil, fludioxonil, iprodione, procymidone, quinoxyfen, vinclozolin and proquinazid.

(14) Decouplers such as, for example, binapacryl, dinocap, ferimzone, fluazinam and meptyldinocap.

(15) Further compounds such as, for example, benthiazole, bethoxazine, capsimycin, carvone, chinomethionat, pyriofenone (chlazafenone), cufraneb, cyflufenamid, cymoxanil, cyprosulfamide, dazomet, debacarb, dichlorophen, diclomezine, difenzoquat, difenzoquat methylsulphate, diphenylamine, EcoMate, fenpyrazamine, flumetover, fluorimid, flusulfamide, flutianil, fosetyl-aluminium, fosetyl-calcium, fosetyl-sodium, hexachlorobenzene, irumamycin, methasulfocarb, methyl isothiocyanate, metrafenone, mildiomycin, natamycin, nickel dimethyldithiocarbamate, nitrothal-isopropyl, octhilinone, oxamocarb, oxyfenthiin, pentachlorophenol and its salts, phenothrin, phosphoric acid and its salts, propamocarb-fosetylate, propanosine-sodium, pyrimorph, (2E)-3-(4-tert-butylphenyl)-3-(2-chloropyridin-4-yl)-1-(morpholin-4-yl)prop-2-en-1-one, (2Z)-3-(4-tert-butylphenyl)-3-(2-chloropyridin-4-yl)-1-(morpholin-4-yl)prop-2-en-1-one, pyrrolnitrin, tebufloquin, tecloftalam, tolnifanide, triazoxide, trichlamide, zarilamid, (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl 2-methylpropanoate, 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, 1-(4-{4-[5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, 1-(4-methoxyphenoxy)-3,3-dimethylbutan-2-yl1H-imidazole-1-carboxylate, 2,3,5,6-tetrachloro-4-(methylsulphonyl)pyridine, 2,3-dibutyl-6-chlorothieno[2,3-d]pyrimidin-4(3H)-one, 2,6-dimethyl-1H,5H-[1,4]dithiino[2,3-c:5,6-c']dipyrrole-1,3,5,7(2H,6H)-tetrone, 2-[5-methyl-3-(trifluoromethyl)-1H-pyrazol-1-yl]-1-(4-{4-[(5R)-5-phenyl-4,5-dihydro-1,2-oxazol-3-yl]-1,3-thiazol-2-yl}piperidin-1-yl)ethanone, 2-[5-methyl-3-(trifluoromethyl)-1H-pyrazol-1-yl]-1-(4-{4-[(5S)-5-phenyl-4,5-dihydro-1,2-oxazol-3-yl]-1,3-thiazol-2-yl}piperidin-1-yl)ethanone, 2-[5-methyl-3-(trifluoromethyl)-1H-pyrazol-1-yl]-1-{4-[4-(5-phenyl-4,5-dihydro-1,2-oxazol-3-yl)-1,3-thiazol-2-yl]piperidin-1-yl ethanone, 2-butoxy-6-iodo-3-propyl-4H-chromen-4-one, 2-chloro-5-[2-chloro-1-(2,6-difluoro-4-methoxyphenyl)-4-methyl-1H-imidazol-5-yl]pyridine, 2-phenylphenol and salts, 3-(4,4,5-trifluoro-3,3-dimethyl-3,4-dihydroisoquinolin-1-yl)quinoline, 3,4,5-trichloropyridine-2,6-dicarbonitrile, 3-chloro-5-(4-chlorophenyl)-4-(2,6-difluorophenyl)-6-methylpyridazine, 4-(4-chlorophenyl)-5-(2,6-difluorophenyl)-3,6-dimethylpyridazine, 5-amino-1,3,4-thiadiazole-2-thiol, 5-chloro-N'-phenyl-N'-(prop-2-yn-1-yl)thiophene-2-sulphonohydrazide, 5-fluoro-2-[(4-fluorobenzyl)-oxy]pyrimidine-4-amine, 5-fluoro-2-[(4-methylbenzyl)oxy]pyrimidine-4-amine, 5-methyl-6-octyl[1,2,4]triazolo[1,5-a]pyrimidine-7-amine, ethyl (2Z)-3-amino-2-cyano-3-phenylacrylate, N'-(4-{[3-(4-chlorobenzyl)-1,2,4-thiadiazol-5-yl]oxy}-2,5-dimethylphenyl)-N-ethyl-N-methylimidoformamide, N-(4-chlorobenzyl)-3-[3-methoxy-4-(prop-2-yn-1-yloxy)phenyl]propanamide, N-[(4-chlorophenyl)-(cyano)methyl]-3-[3-methoxy-4-(prop-2-yn-1-yloxy)phenyl]propanamide, N-[(5-bromo-3-chloropyridin-2-yl)methyl]-2,4-dichloronicotinamide, N-[1-(5-bromo-3-chloropyridin-2-yl)ethyl]-2,4-dichloronicotinamide, N-[1-(5-bromo-3-chloropyridin-2-yl)ethyl]-2-fluoro-4-iodonicotinamide, N-{(E)-[(cyclopropyl-methoxy)imino][6-(difluoromethoxy)-2,3-difluorophenyl]methyl}-2-phenyl-acetamide, N-{(Z)-[(cyclopropylmethoxy)imino][6-(difluoromethoxy)-2,3-difluorophenyl]methyl}-2-phenylacetamide, N'-{4-[(3-tert-butyl-4-cyano-1,2-thiazol-5-yl)oxy]-2-chloro-5-methylphenyl}-N-ethyl-N-methylimidoformamide, N-methyl-2-(1-{[5-methyl-3-(trifluoromethyl)-1H-pyrazol-1-yl]acetyl}piperidin-4-yl)-N-(1,2,3,4-tetrahydronaphthalen-1-yl)-1,3-thiazole-4-carboxamide, N-methyl-2-(1-[5-methyl-3-(trifluoromethyl)-1H-pyrazol-1-yl]acetyl}piperidin-4-yl)-N-[(1R)-1,2,3,4-tetrahydronaphthalen-1-yl]-1,3-thiazole-4-carboxamide, N-methyl-2-(1-{[5-methyl-3-(trifluoromethyl)-1H-pyrazol-1-yl]acetyl}piperidin-4-yl)-N-[(1S)-1,2,3,4-tetrahydronaphthalen-1-yl]-1,3-thiazole-4-carboxamide, pentyl {6-[({[(1-methyl-1H-tetrazol-5-yl)(phenyl)methylene]amino}oxy)-methyl]pyridin-2-yl}carbamate, phenazine-1-carboxylic acid, quinolin-8-ol, quinolin-8-ol sulphate (2:1), tert-butyl {6-[({[(1-methyl-1H-tetrazol-5-yl)(phenyl)methylene]amino}oxy)methyl]pyridin-2-yl}carbamate, 1-methyl-3-(trifluoromethyl)-N-[2'-(trifluoromethyl)biphenyl-2-yl]-1H-pyrazole-4-carboxamide, N-(4'-chlorobiphenyl-2-yl)-3-(difluoromethyl)-1-methyl-1H-pyrazole-4-carboxamide, N-(2',4'-dichlorobiphenyl-2-yl)-3-(difluoromethyl)-1-methyl-1H-pyrazole-4-carboxamide, 3-(difluoromethyl)-1-methyl-N-[4'-(trifluoromethyl)biphenyl-2-yl]-1H-pyrazole-4-carboxamide, N-(2',5'-difluoro-biphenyl-2-yl)-1-methyl-3-(trifluoromethyl)-1H-pyrazole-4-carboxamide, 3-(difluoromethyl)-1-methyl-N-[4'-(prop-1-yn-1-yl)biphenyl-2-yl]-1H-pyrazole-4-carboxamide, 5-fluoro-1,3-dimethyl-N-[4'-(prop-1-yn-1-yl)biphenyl-2-yl]-1H-pyrazole-4-carboxamide, 2-chloro-N-[4'-(prop-1-yn-1-yl)biphenyl-2- yl]nicotinamide, 3-(difluoromethyl)-N-[4'-(3,3-dimethylbut-1-yn-1-yl)biphenyl-2-yl]-1-methyl-1H-pyrazole-4-carboxamide, N-[4'-(3,3-dimethylbut-1-yn-1-yl)biphenyl-2-yl]-5-fluoro-1,3-dimethyl-1H-pyrazole-4-carboxamide, 3-(difluoromethyl)-N-(4'-ethynylbiphenyl-2-yl)-1-methyl-1H-pyrazole-4-carboxamide, N-(4'-ethynylbiphenyl-2-yl)-5-fluoro-1,3-dimethyl-1H-pyrazole-4-carboxamide, 2-chloro-N-(4'-ethynylbiphenyl-2-yl)nicotinamide, 2-chloro-N-[4'-(3,3-dimethylbut-1-yn-1-yl)biphenyl-2-yl]nicotinamide, 4-(difluoromethyl)-2-methyl-N-[4'-(trifluoromethyl)biphenyl-2-yl]-1,3-thiazole-5-carboxamide, 5-fluoro-N-[4'-(3-hydroxy-3-methylbut-1-yn-1-yl)biphenyl-2-yl]-1,3-dimethyl-1H-pyrazole-4-carboxamide, 2-chloro-N-[4'-(3-hydroxy-3-methylbut-1-yn-1-yl)biphenyl-2-yl]nicotinamide, 3-(difluoromethyl)-N-[4'-(3-methoxy-3-methylbut-1-yn-1-yl)biphenyl-2-yl]-1-methyl-1H-pyrazole-4-carboxamide, 5-fluoro-N-[4'-(3-methoxy-3-methylbut-1-yn-1-yl)biphenyl-2-yl]-1,3-dimethyl-1H-pyrazole-4-carboxamide, 2-chloro-N-[4'-(3-methoxy-3-methylbut-1-yn-1-yl)biphenyl-2-yl]nicotinamide, (5-bromo-2-methoxy-4-methylpyridin-3-yl)(2,3,4-trimethoxy-6-methylphenyl)methanone, N-[2-(4-{[3-(4-chlorophenyl)prop-2-yn-1-yl]oxy}-3-methoxyphenyl)ethyl]-N2-(methylsulphonyl)valinamide, 4-oxo-4-[(2-phenylethyl)amino]butanoic acid, but-3-yn-1-yl {6-[({[(Z)-(1-methyl-1H-tetrazol-5-yl)(phenyl)methylene]amino}oxy)methyl]pyridin-2-yl}carbamate, 4-amino-5-fluoropyrimidin-2-ol (tautomeric form: 4-amino-5-fluoropyrimidin-2(1H)-one), propyl 3,4,5-trihydroxybenzoate, 1,3-dimethyl-N-(1,1,3-trimethyl-2,3-dihydro-1H-inden-4-yl)-1H-pyrazole-4-carboxamide, 1,3-dimethyl-N-[(3R)-1,1,3-trimethyl-2,3-dihydro-1H-inden-4-yl]-1H-pyrazole-4-carboxamide, 1,3-dimethyl-N-[(3S)-1,1,3-trimethyl-2,3-dihydro-1H-inden-4-yl]-1H-pyrazole-4-carboxamide, [3-(4-chloro-2-fluorophenyl)-5-(2,4-difluorophenyl)-1,2-oxazol-4-yl](pyridin-3-yl)methanol, (S)-[3-(4-chloro-2-fluorophenyl)-5-(2,4-difluorophenyl)-1,2-oxazol-4-yl](pyridin-3-yl)methanol, (R)-[3-(4-chloro-2-fluorophenyl)-5-(2,4-difluorophenyl)-1,2-oxazol-4-yl](pyridin-3-yl)methanol, 2-{[3-(2-chlorophenyl)-2-(2,4-difluorophenyl)oxiran-2-yl]methyl}-2,4-dihydro-3H-1,2,4-triazole-3-thione, 1-{[3-(2-chlorophenyl)-2-(2,4-difluorophenyl)oxiran-2-yl]methyl}-1H-1,2,4-triazol-5-ylthiocyanate, 5-(allylsulfanyl)-1-{[3-(2-chlorophenyl)-2-(2,4-difluorophenyl)oxiran-2-yl]methyl}-1H-1,2,4-triazole, 2-[1-(2,4-dichlorophenyl)-5-hydroxy-2,6,6-trimethylheptan-4-yl]-2,4-dihydro-3H-1,2,4-triazole-3-thione, 2-{[rel(2R,3S)-3-(2-chlorophenyl)-2-(2,4-difluorophenyl)oxiran-2-yl]methyl}-2,4-dihydro-3H-1,2,4-triazole-3-thione, 2-{[rel(2R,3R)-3-(2-chlorophenyl)-2-(2,4-difluorophenyl)oxiran-2-yl]methyl}-2,4-dihydro-3H-1,2,4-triazole-3-thione, 1-{[rel(2R,3S)-3-(2-chlorophenyl)-2-(2,4-difluorophenyl)oxiran-2-yl]methyl}-1H-1,2,4-triazol-5-yl thiocyanate, 1-{[rel(2R,3R)-3-(2-chlorophenyl)-2-(2,4-difluorophenyl)oxiran-2-yl]methyl}-1H-1,2,4-triazol-5-yl thiocyanate, 5-(allylsulphanyl)-1-{[rel(2R,3S)-3-(2-chlorophenyl)-2-(2,4-difluorophenyl)oxiran-2-yl]methyl}-1H-1,2,4-triazole, 5-(allylsulphanyl)-1-{[rel(2R,3R)-3-(2-chlorophenyl)-2-(2,4-difluorophenyl)oxiran-2-yl]methyl}-1H-1,2,4-triazole, 2-[(2S,4S,5S)-1-(2,4-dichlorophenyl)-5-hydroxy-2,6,6-trimethylheptan-4-yl]-2,4-dihydro-3H-1,2,4-triazole-3-thione, 2-[(2R,4S,5S)-1-(2,4-dichlorophenyl)-5-hydroxy-2,6,6-trimethylheptan-4-yl]-2,4-dihydro-3H-1,2,4-triazole-3-thione, 2-[(2R,4R,5R)-1-(2,4-dichlorophenyl)-5-hydroxy-2,6,6-trimethylheptan-4-yl]-2,4-dihydro-3H-1,2,4-triazole-3-thione, 2-[(2S,4R,5R)-1-(2,4-dichlorophenyl)-5-hydroxy-2,6,6-trimethylheptan-4-yl]-2,4-dihydro-3H-1,2,4-triazole-3-thione, 2-[(2S,4S,5R)-1-(2,4-dichlorophenyl)-5-hydroxy-2,6,6-trimethylheptan-4-yl]-2,4-dihydro-3H-1,2,4-triazole-3-thione, 2-[(2R,4S,5R)-1-(2,4-dichlorophenyl)-5-hydroxy-2,6,6-trimethylheptan-4-yl]-2,4-dihydro-3H-1,2,4-triazole-3-thione, 2-[(2R,4R,5S)-1-(2,4-dichlorophenyl)-5-hydroxy-2,6,6-trimethylheptan-4-yl]-2,4-dihydro-3H-1,2,4-triazole-3-thione, 2-[(2S,4R,5S)-1-(2,4-dichlorophenyl)-5-hydroxy-2,6,6-trimethylheptan-4-yl]-2,4-dihydro-3H-1,2,4-triazole-3-thione, 2-fluoro-6-(trifluoromethyl)-N-(1,1,3-trimethyl-2,3-dihydro-1H-inden-4-yl)benzamide, 2-(6-benzylpyridin-2-yl)quinazoline, 2-[6-(3-fluoro-4-methoxyphenyl)-5-methylpyridin-2-yl]quinazoline, 3-(4,4-difluoro-3,3-dimethyl-3,4-dihydroisoquinolin-1-yl)quinoline, abscisic acid, 3-(difluoromethyl)-N-methoxy-1-methyl-N-[1-(2,4,6-trichlorophenyl)propan-2-yl]-1H-pyrazole-4-carboxamide, N'-[5-bromo-6-(2,3-dihydro-1H-inden-2-yloxy)-2-methylpyridin-3-yl]-N-ethyl-N-methylimidoformamide, N'-{5-bromo-6-[1-(3,5-difluorophenyl)ethoxy]-2-methylpyridin-3-yl}-N-ethyl-N-methylimidoformamide, N'-{5-bromo-6-[(1R)-1-(3,5-difluorophenyethoxy]-2-methylpyridin-3-yl}-N-ethyl-N-methylimidoformamide, N'-{5-bromo-6-[(1S)-1-(3,5-difluorophenyl)-ethoxy]-2-methylpyridin-3-yl}-N-ethyl-N-methylimidoformamide, N'-{5-bromo-6-[(cis-4-isopropylcyclohexyl)oxy]-2-methylpyridin-3-yl}-N-ethyl-N-methylimido-formamide, N'-{5-bromo-6-[(trans-4-isopropylcyclohexyl)oxy]-2-methylpyridin-3-yl}-N-ethyl-N-methylimidoformamide, N-cyclopropyl-3-(difluoromethyl)-5-fluoro-N-(2-isopropylbenzyl)-1-methyl-1H-pyrazole-4-carboxamide, N-cyclopropyl-N-(2-cyclopropylbenzyl)-3-(difluoromethyl)-5-fluoro-1-methyl-1H-pyrazole-4-carboxamide, N-(2-tert-butylbenzyl)-N-cyclopropyl-3-(difluoro-methyl)-5-fluoro-1-methyl-1H-pyrazole-4-carboxamide, N-(5-chloro-2-ethylbenzyl)-N-cyclopropyl-3-(difluoromethyl)-5-fluoro-1-methyl-1H-pyrazole-4-carboxamide, N-(5-chloro-2-isopropylbenzyl)-N-cyclopropyl-3-(difluoromethyl)-5-fluoro-1-methyl-1H-pyrazole-4-carboxamide, N-cyclopropyl-3-(difluoromethyl)-N-(2-ethyl-5-fluorobenzyl)-5-fluoro-1-methyl-1H-pyrazole-4-carboxamide, N-cyclopropyl-3-(difluoromethyl)-5-fluoro-N-(5-fluoro-2-isopropylbenzyl)-1-methyl-1H-pyrazole-4-carboxamide, N-cyclopropyl-N-(2-cyclopropyl-5-fluorobenzyl)-3-(difluoromethyl)-5-fluoro-1-methyl-1H-pyrazole-4-carboxamide, N-(2-cyclopentyl-5-fluorobenzyl)-N-cyclopropyl-3-(difluoromethyl)-5-fluoro-1-methyl-1H-pyrazole-4-carboxamide, N-cyclopropyl-3-(difluoromethyl)-5-fluoro-N-(2-fluoro-6-isopropylbenzyl)-1-methyl-1H-pyrazole-4-carboxamide, N-cyclopropyl-3-(difluoromethyl)-N-(2-ethyl-5-methylbenzyl)-5-fluoro-1-methyl-1H-pyrazole-4-carboxamide, N-cyclopropyl-3-(difluoromethyl)-5-fluoro-N-(2-isopropyl-5-methylbenzyl)-1-methyl-1H-pyrazole-4-carboxamide, N-cyclopropyl-N-(2-cyclopropyl-5-methylbenzyl)-3-(difluoromethyl)-5-fluoro-1-methyl-1H-pyrazole-4-carboxamide, N-(2-tert-butyl-5-methylbenzyl)-N-cyclopropyl-3-(difluoromethyl)-5-fluoro-1-methyl-1H-pyrazole-4-carboxamide, N-[5-chloro-2-(trifluoromethyl)benzyl]-N-cyclopropyl-3-(difluoromethyl)-5-fluoro-1-methyl-1H-pyrazole-4-carboxamide, N-cyclopropyl-3-(difluoromethyl)-5-fluoro-1-methyl-N-[5-methyl-2-(trifluoromethyl)benzyl]-1H-pyrazole-4-carboxamide, N-[2-chloro-6-(trifluoromethyl)benzyl]-N-cyclopropyl-3-(difluoromethyl)-5-fluoro-1-methyl-1H-pyrazole-4-carboxamide, N-[3-chloro-2-fluoro-6-(trifluoromethyl)benzyl]-N-cyclopropyl-3-(difluoromethyl)-5-fluoro-1-methyl-1H-pyrazole-4-carboxamide, N-cyclopropyl-3-(difluoromethyl)-N-(2-ethyl-4,5-dimethylbenzyl)-5-fluoro- 1-methyl-1H-pyrazole-4-carboxamide, N-cyclopropyl-3-(difluoromethyl)-5-fluoro-N-(2-isopropylbenzyl)-1-methyl-1H-pyrazol-4-carbothioamide, 3-(difluoro-methyl)-N-(7-fluoro-1,1,3-trimethyl-2,3-dihydro-1H-inden-4-yl)-1-methyl-1H-pyrazole-4-carboxamide, 3-(difluoromethyl)-N-[(3R)-7-fluoro-1,1,3-trimethyl-2,3-dihydro-1H-inden-4-yl]-1-methyl-1H-pyrazole-4-carboxamide, 3-(difluoromethyl)-N-[(3S)-7-fluoro-1,1,3-trimethyl-2,3-dihydro-1H-inden-4-yl]-1-methyl-1H-pyrazole-4-carboxamide, N'-(2,5-dimethyl-4-phenoxyphenyl)-N-ethyl-N-methylimidoformamide, N'-{4-[(4,5-dichloro-1,3-thiazol-2-yl)oxy]-2,5-dimethylphenyl}-N-ethyl-N-methylimidoformamide, N-(4-chloro-2,6-difluorophenyl)-4-(2-chloro-4-fluorophenyl)-1,3-dimethyl-1H-pyrazole-5-amine.

Particularly suitable seed treatment active ingredients that may be utilized in the treatment composition include acetamiprid, clothianidin imidacloprid, thiacloprid, thiamethoxam, abamectin, emamectin, emamectin-benzoate, rynaxypyr (chloroantraniliprole), cyazypyr (cyntraniliprole), spinetoram, spinosad, sulfoxaflor, lambda-cyhalothrin, beta-cyfluthrin, tefluthrin, flupyradifurone, tetraniliprole, *Bacillus firmus* CNCM I 1582, *Bacillus subtilis* QST 713, *Bacillus subtilis* AQ30002, prothioconazole, metalaxyl, mefenoxam, benalaxyl, kiralaxyl, trifloxystrobin, azoxystrobin, picoxystrobin, pyraclostrobin, fluopyram, thiram, tebuconazole, fludioxonil, and ipconazole.

In some embodiments, the insecticide, fungicide, nematicide, and/or other pesticides is present in the treatment compositions of the present invention in an amount of at least 15% such as at least 20%, such as at least 25%, such as at least 30% and/or no more than 80%, such as no more than 75%, such as no more than 60%, such as no more than 50%.

In some embodiments, the seed treatment compositions of the present invention may further include any of a variety of additives such as defoamers, devolatilizers, thickeners, flow control additives, colorants (including pigments and dyes), surfactants, dispersants, neutralizers, biological materials (such as inoculants), nutrients, micronutrients, or surface additives. Inert materials may also be included such as, for example, to improve handling or packaging and may include, for example, silica, starches, clays and other minerals.

For example, in some embodiments, the seed treatment compositions include an inorganic lubricant, such as, for example, talc, mica, graphite, a carbide, a carbonate, an oxide of carbon, a cyanide, an allotrope of carbon, or a mixture of two or more thereof.

When used, such inorganic lubricant(s) are often present in the seed treatment composition in an amount of at least 0.5%, such as at least 1%, such as at least 1.5% and/or no more than 10%, such as no more than 8%, such as no more than 5%.

In some embodiments, in addition to or in lieu of an inorganic lubricant, the seed treatment composition of the present invention may comprise an organic lubricant. Examples of such organic lubricants include, but are not limited to a wax, such as, polyethylene, powdered polyethylene, carnuba, paraffin, polypropylene, an oxidized polyethylene wax, montan waxes, microcrystalline waxes, Fischer-Tropsch waxes, amide waxes, Ethylene-Acrylic-Acid (EAA) waxes, polyolefin waxes, Ethylene bis stearamide (EBS) waxes, animal waxes (bees wax and lanolin), vegetable waxes (carnauba and candelilla), or slac and scale waxes, polytetrafluoroethylene, including mixtures of two or more thereof. In some embodiments, the wax comprises polyethylene wax, such as MICHEM Wax 437 from Michelman, Inc. As a result, embodiments of the present invention are also directed to seed treatment compositions comprising, consisting essentially of, or, in some cases, consisting of: (A) an aqueous polyurethane dispersion; (B) an insecticide, a fungicide, a nematicide, and/or other pesticides; and (C) a polyethylene wax.

In some embodiments, the seed treatment composition is applied to a seed and then the seed is subsequently coated with a lubricant compound.

In certain embodiments, a treatment composition as described herein is applied to a seed at the same time or before the planter fills the planter hopper with seed. In other embodiments, a seed treatment composition as described herein is applied to a seed as a farmer fills the planter hopper with seed. In some embodiments, the hopper forms a component part of a planter, such as an air or vacuum planter, with a planter mechanism, examples of which are commercially available from, for example, John Deere, Case IH, Kinze, AGCO White, Great Plains, or Precision Planting.

In certain embodiments, the methods and compositions described herein may reduce dust emissions by at least 5%, such as at least 10%, at least 15%, at least 20%, at least 25% and/or up to 90%, up to 80%, up to 70%, up to 60%, or up to 50% relative to the use of an identical seed treatment composition in which a polyolefin latex, such as a carboxylated styrene/butadiene polymer, is used as the polymeric component of the composition rather than the aqueous polyurethane dispersion when comparing the same type of seed. In certain embodiments, the methods and compositions described herein reduce dust emissions by at least 50%, such as at least 60%, at least 70%, at least 80%, at least 90% or at least 95% relative to the use of an identical seed treatment composition in which no polymeric component is used in the composition when comparing the same type of seed.

In certain embodiments, a seed treatment composition as described herein is applied to a seed at a rate of 0.1-5.0 oz/cwt (ounces/hundredweight), 0.5-4.0 oz/cwt, 1.0-3.5 oz/cwt, 1.5-3.0 oz/cwt, 2.0-3.0 oz/cwt, 2.0-2.5 oz/cwt, or 0.2 oz/cwt, 0.5 oz/cwt, 0.75 oz/cwt, 1.0 oz/cwt, 1.5 oz/cwt, 2.0 oz/cwt, 2.5 oz/cwt, 3.0 oz/cwt, 3.5 oz/cwt, 4.0 oz/cwt, 4.5 oz/cwt, 5.0 oz/cwt, or 0.2 oz/cwt or more, 0.5 oz/cwt or more, 0.75 oz/cwt or more, 1.0 oz/cwt or more, 1.5 oz/cwt or more, 2.0 oz/cwt or more, 2.5 oz/cwt or more, 3.0 oz/cwt or more, 3.5 oz/cwt or more, 4.0 oz/cwt or more, 4.5 oz/cwt or more, or 5.0 oz/cwt or more.

In some embodiments of the present invention, a seed treatment composition described herein is applied to a seed in a single application step. In other respects, a seed treatment composition described herein is applied in multiple application steps. In yet another embodiment, a seed treatment composition described herein is applied in one, two, three or more application steps to a seed.

Seeds which can be treated with the seed treatment composition described herein include, for example, any agricultural or vegetable seeds that are planted through, for example, a vacuum planter. Examples of such seeds include, but are not limited to, corn seed, cotton seed, sorghum seed, oat seed, rye seed, barley seed, soybean seed, vegetable seed, wheat seed, sugarbeet seed, rice, sunflower seed, lettuce seed, and spinach seed. Specific examples of corn seeds capable of being treated with the treatment compositions described herein include, for example, sweet corn (for example, zea mays convar. saccharata var. Rugosa), silver queen corn, golden bantam, early sunglow, Indian corn, sugar corn, pole corn, field corn, dent corn, flint corn, flour corn, blue corn (for example, *Zea mays amylacea*), popcorn, and waxy corn.

Seeds may be treated with the described compositions by applying the disclosed compositions directly to the seed. In another embodiment, the seed may be treated indirectly, for example by treating the environment or habitat to which the seed is exposed.

Conventional treatment methods may be used to treat the environment or habitat including dipping, spraying, rolling, fumigating, chemigating, fogging, scattering, brushing on, shanking or injecting.

Some embodiments of the present invention are directed to a kit comprising, consisting essentially of, or consisting of any of the seed treatment compositions disclosed herein. In some embodiments, the kit provides instructions or guidance regarding the use of the seed treatment compositions or methods described herein. In some embodiments, the instructions are included with the kit, separate from the kit, in the kit, or are included on the kit packaging. In yet another aspect, the instructions provide for application of a seed treatment composition at planting.

The present disclosure also provides for a method of reducing active agent dust exposure to an insect by applying a seed treatment composition described herein to a seed. Exemplary insects are pollinating insects and insects capable of being negatively influenced by the presence of a pesticide, fungicide, nematicide, or insecticide dust. In some respects, the insect is a bee, such as, but not limited to, a Western honey bee, European honey bee (Apis mellifera), or Africanized honey bee.

As will be appreciated by the foregoing description, embodiments of the present invention are directed to seed treatment compositions that comprise: (A) an aqueous polyurethane dispersion; and (B) an insecticide, a fungicide, a nematicide, and/or other pesticides, wherein the aqueous polyurethane dispersion forms a film exhibiting: (a) a microhardness of no more than 15 N/mm$^2$, (b) a $T_g$ of −54° C. to −4° C., (c) a percent elongation of 44 to 820, and (d) a tensile strength of 130 lb/in$^2$ (9.1 kg/cm$^2$/0.9 megapascals (MPa)) to 1300 lb/in$^2$ (91.4 kg/cm$^2$/9.0 MPa).

Embodiments of the present invention are directed to a seed treatment composition of the previous paragraph, wherein the $T_g$ is −54° C. to −35° C., the percent elongation is 250 to 700, and/or the tensile strength is 130 lb/in$^2$ (0.9 MPa) to 1000 lb/in$^2$ (6.9 MPa) or 130 lb/in$^2$ (0.9 MPa) to 900 lb/in$^2$ (6.2 MPa).

Embodiments of the present invention are directed to a seed treatment composition of either of the previous two paragraphs, wherein the aqueous polyurethane dispersion comprises one or more polyurethanes that are the reaction product of reactants comprising, consisting essentially of, or, in some cases, consisting of: (i) a polyisocyanate; (ii) a polymeric polyol having a $M_n$ of 400 to 8,000 g/mol; (iii) a compound comprising at least one isocyanate-reactive group and an anionic group or potentially anionic group; (iv) optionally a mono functional polyalkylene ether; (v) optionally a polyol having a molecular weight of less than <400 g/mol, and (vi) optionally a polyamine or amino alcohol having a molecular weight of from 32 to 400 g/mol.

Embodiments of the present invention are directed to a seed treatment composition of the previous paragraph, wherein the polyisocyanate of the seed treatment composition (i) comprises an aromatic, araliphatic, aliphatic and/or cycloaliphatic polyisocyanate, such as 1,6-hexamethylene diisocyanate (HDI), pentamethylene diisocyanate (PDI), isophorone diisocyanate (IPDI), the isomeric bis-(4,4'-isocyanatocyclohexyl)methanes or a mixture thereof.

Embodiments of the present invention are directed to a seed treatment composition of either of the previous two paragraphs, wherein component (i) of the seed treatment composition is applied in an amount of at least 5% by weight, such as at least 10 or at least 20% by weight and/or no more than 60% by weight, such as no more than 50 or, in some cases, no more than 45% by weight, based on the total weight of reactants used to make the polyurethane.

Embodiments of the present invention are directed to a seed treatment composition of any of the previous three paragraphs, wherein the polymeric polyol of the seed treatment composition has a $M_n$ of from 400 to 6000 g/mol, 500 to 3000 g/mol, 1000 to 3000 g/mol or 1500 to 3000 g/mol.

Embodiments of the present invention are directed to a seed treatment composition of any of the previous four paragraphs, wherein the polymeric polyol of the seed treatment composition has a hydroxyl number of from 20 to 400 mg KOH/g of substance, such as 20 to 300 mg KOH/g of substance, 20 to 200 mg KOH/g of substance or 20 to 100 mg/KOH g of substance.

Embodiments of the present invention are directed to a seed treatment composition of any of the previous five paragraphs, wherein the polymeric polyol of the seed treatment composition has a hydroxyl functionality of 1.5 to 6, such as 1.8 to 3 or 1.9 to 2.1.

Embodiments of the present invention are directed to a seed treatment composition of any of the previous six paragraphs, wherein the polymeric polyol of the seed treatment composition comprises, consists essentially of, or, in some cases, consists of a polyester polyol, a polyacrylate polyol, a polyurethane polyol, a polycarbonate polyol, a polyether polyol, a polyester polyacrylate polyol, a polyurethane polyacrylate polyol, a polyurethane polyester polyol, a polyurethane polyether polyol, a polyurethane polycarbonate polyol, a polyester polycarbonate polyol, a phenol/formaldehyde resin, or a mixture thereof.

Embodiments of the present invention are directed to a seed treatment composition of the previous paragraph, wherein the polymeric polyol of the seed treatment composition comprises, consists essentially of or consists of a polyester polyol, such as a polyester polyol that is a reaction product of butanediol and/or neopentyl glycol and/or hexanediol and/or ethylene glycol and/or diethylene glycol with adipic acid and/or phthalic acid and/or isophthalic acid, such as polyester polyols that area reaction product of butanediol and/or neopentyl glycol and/or hexanediol with adipic acid and/or phthalic acid.

Embodiments of the present invention are directed to a seed treatment composition of either of the previous two paragraphs, wherein the polyester polyol of the seed treatment composition has a hydroxyl functionality of 1.5 to 6.0, such as 1.8 to 3.0, a hydroxyl number of 20 to 700 mg KOH/g solid, such as 20 to 100, 20 to 80 or, in some cases 40 to 80 mg KOH/g solid, and/or a $M_n$ of 500 to 3000 g/mol, such as 600 to 2500 g/mol.

Embodiments of the present invention are directed to a seed treatment composition of any of the previous nine paragraphs, wherein component (ii) of the seed treatment composition is included in an amount of at least 20% by weight, such as at least 30 or at least 40% by weight and/or no more than 80% by weight, such as no more than 70% by weight, based on the total weight of reactants used to make the polyurethane.

Embodiments of the present invention are directed to a seed treatment composition of any of the previous ten paragraphs, wherein component (iii) of the composition is a compound comprising carboxylate, sulfonate, and/or phosphonate groups or groups which can be converted into the above-mentioned groups by salt formation.

Embodiments of the present invention are directed to a seed treatment composition of the previous paragraph wherein the compound (iii) of the seed treatment composition comprises, consists essentially of, or, in some cases, consists of, a mono- and di-hydroxycarboxylic acid, a mono- and di-aminocarboxylic acid, a mono- and di-hydroxysulfonic acid, a mono- and di-aminosulfonic acid, a mono- and di-hydroxyphosphonic acid and/or a mono- and di-aminophosphonic acids or a salt thereof, such as dimethylolpropionic acid, dimethylolbutyric acid, hydroxypivalic acid, N-(2-aminoethyl)-β-alanine, 2-(2-amino-ethylamino)-ethanesulfonic acid, ethylene-diamine-propyl- or -butyl-sulfonic acid, 1,2- or 1,3-propylenediamine-3-ethylsulfonic acid, malic acid, citric acid, glycolic acid, lactic acid.

Embodiments of the present invention are directed to a seed treatment composition of any of the previous twelve paragraphs, wherein component (iii) of the seed treatment composition is included in an amount of at least 0.1% by weight, such as at least 1, or at least 3% by weight and/or no more than 10% by weight, such as no more than 7% by weight, based on the total weight of reactants used to make the polyurethane.

Embodiments of the present invention are directed to a seed treatment composition of any of the previous thirteen paragraphs, wherein component (iv) of the seed treatment composition is included and comprises a compound of the formula: H—Y'—X—Y—R, in which R is a monovalent hydrocarbon radical having 1 to 12 carbon atoms, such as an unsubstituted alkyl radical having 1 to 4 carbon atoms; X is a polyalkylene oxide chain having 5 to 90, such as 20 to 70 chain members, which may comprise at least 40%, such as at least 65%, ethylene oxide units and which in addition to ethylene oxide units may comprise propylene oxide, butylene oxide and/or styrene oxide units; and Y and Y' are each independently oxygen or —NR'— in which R' is H or R, in which R is defined above.

Embodiments of the present invention are directed to a seed treatment composition of the previous paragraph, wherein component (iv) of the seed treatment composition contains 7 to 55 ethylene oxide units per molecule Embodiments of the present invention are directed to a seed treatment composition of either of the previous two paragraphs, wherein component (iv) of the seed treatment composition comprises, consists essentially of, or, in some cases, consists of, a copolymer of ethylene oxide with propylene oxide that contains ethylene oxide in an amount of at least 40% by weight, such as at least 50% by weight, at least 60% by weight or at least 65% by weight and/or up to 90% by weight or up to 80% by weight, based on the total weight of ethylene oxide and propylene oxide.

Embodiments of the present invention are directed to a seed treatment composition of any of the previous three paragraph, wherein the $M_n$ of such a copolymer of the composition is 300 g/mol to 6000 g/mol, such as 500 g/mol to 4000 g/mol, such as 1000 g/mol to 3000 g/mol.

Embodiments of the present invention are directed to a seed treatment composition of any of the previous four paragraphs, wherein component (iv) of the seed treatment composition is included in an amount of at least 1% by weight, such as at least 5, or at least 10% by weight and/or no more than 30% by weight, such as no more than 20% by weight, based on the total weight of reactants used to make the polyurethane.

Embodiments of the present invention are directed to a seed treatment composition of any of the previous seventeen paragraphs, wherein component (v) of the seed treatment composition is included and, in some embodiments, is included in an amount of at least 1% by weight, such as at least 2, or at least 3% by weight and/or no more than 20% by weight, such as no more than 10 or no more than 5% by weight, based on the total weight of reactants used to make the polyurethane.

Embodiments of the present invention are directed to a seed treatment composition of any of the previous eighteen paragraphs, wherein component (vi) of the seed treatment composition is included and comprises, consists essentially of, or, in some cases, consists of, a di- or poly-amine, a hydrazide, an aminoalcohol, or a mixture thereof and, in some embodiments, component (6) of the seed treatment composition is included in an amount of at least 1% by weight, such as at least 3 or at least 5% by weight and/or no more than 10% by weight, such as no more than 8 or, in some cases, no more than 7% by weight, based on the total weight of reactants used to make the polyurethane.

Embodiments of the present invention are directed to a seed treatment composition of any of the previous nineteen paragraphs, wherein the sum of components (i)-(vi) of the seed treatment composition is 100 percent by weight, based on the total weight of the reactants used to make the polyurethane.

Embodiments of the present invention are directed to a seed treatment composition of any of the previous twenty paragraphs, wherein the seed treatment composition comprises a blend of (A) an aqueous polyurethane dispersion which is an anionic/non-ionic polyester polyurethane dispersed in water that is a reaction product of components (i), (ii), (iii), (iv), and (vi) described above, optionally in combination with (B) an anionic aliphatic polyester-polyurethane, such as a dispersion that is a reaction product of components (i), (ii), (iii), (v), and (vi) described above. In certain embodiments, the weight ratio of the foregoing aqueous polyurethane dispersions in the blend of the seed treatment compositions of the present invention is (A+B)/(C) is greater than 1:1, such as greater than 2:1.

Embodiments of the present invention are directed to a seed treatment composition of any of the previous twenty-six paragraphs, wherein the aqueous polyurethane dispersion is present in the treatment composition in an amount such that the total amount of polyurethane that is present in the treatment composition is at least 1%, such as at least 2%, or in some cases at least 4% and/or no more than 20%, such as no more than 15% and in some cases, no more than 10%.

Embodiments of the present invention are directed to a seed treatment composition of any of the previous twenty-seven paragraphs, wherein the insecticide, fungicide, nematicide, and/or other pesticide comprises acetamiprid, clothianidin imidacloprid, thiacloprid, thiamethoxam, abamectin, emamectin, emamectin-benzoate, rynaxypyr (chloroantraniliprole), cyazypyr (cyntraniliprole), spinetoram, spinosad, sulfoxaflor, lambda-cyhalothrin, beta-cyfluthrin, tefluthrin, flupyradifurone, tetraniliprole, *Bacillus firmus* CNCM I 1582, *Bacillus subtilis* QST 713, *Bacillus subtilis* AQ30002, prothioconazole, metalaxyl, mefenoxam, benalaxyl, kiralaxyl, trifloxystrobin, azoxystrobin, picoxystrobin, pyraclostrobin, fluopyram, thiram, tebuconazole, fludioxonil, and ipconazole.

Embodiments of the present invention are directed to a seed treatment composition of any of the previous twenty-eight paragraphs, wherein the insecticide, fungicide, nematicide, and/or other pesticide is present in the seed treatment compositions of the present invention in an amount of at least 15%, such as at least 20%, such as at least 25%, such as at least 30% and/or no more than 80%, such as no more than 75%, such as no more than 60%, such as no more than 50%.

Embodiments of the present invention are directed to a seed treatment composition of any of the previous twenty-nine paragraphs, wherein the seed treatment composition comprises an inorganic lubricant and/or an organic lubricant, such as a wax, such as a polyethylene wax.

Embodiments of the present invention are also directed to seed treatment compositions comprising: (A) an aqueous polyurethane dispersion, such as any of the described above; (B) an insecticide, a fungicide, a nematicide, and/or other pesticides, such as any of those described above; and (C) a polyethylene wax.

Embodiments of the present invention are directed to a method of using a seed treatment composition of any of the previous thirty one paragraphs, comprising applying the seed treatment composition to a seed, such as at the same time or before the planter fills the planter hopper with seed or as a farmer fills the planter hopper with seed.

Embodiments of the present invention are directed to a method of the previous paragraphs, wherein the hopper forms a component part of a planter, such as an air or vacuum planter, with a planter mechanism.

Embodiments of the present invention are directed to a method of either of the previous two paragraphs, wherein the method reduces dust emissions by at least 5%, such as at least 10%, at least 15%, at least 20%, at least 25% and/or up to 90%, up to 80%, up to 70%, up to 60%, or up to 50% relative to the use of an identical treatment composition in which a polyolefin latex, such as a carboxylated styrene/butadiene polymer, is used as the polymeric component of the composition rather than the aqueous polyurethane dispersion when comparing the same type of seed and/or reduces dust emissions by at least 50%, such as at least 60%, at least 70%, at least 80%, at least 90% or at least 95% relative to the use of an identical seed treatment composition in which no polymeric component is used in the seed treatment composition when comparing the same type of seed.

Embodiments of the present invention are directed to a method of any of the previous three paragraphs wherein the seed treatment composition is applied to a seed at a rate of 0.1-5.0 oz/cwt (ounces/hundredweight), 0.5-4.0 oz/cwt, 1.0-3.5 oz/cwt, 1.5-3.0 oz/cwt, 2.0-3.0 oz/cwt, 2.0-2.5 oz/cwt, or 0.2 oz/cwt, 0.5 oz/cwt, 0.75 oz/cwt, 1.0 oz/cwt, 1.5 oz/cwt, 2.0 oz/cwt, 2.5 oz/cwt, 3.0 oz/cwt, 3.5 oz/cwt, 4.0 oz/cwt, 4.5 oz/cwt, 5.0 oz/cwt, or 0.2 oz/cwt or more, 0.5 oz/cwt or more, 0.75 oz/cwt or more, 1.0 oz/cwt or more, 1.5 oz/cwt or more, 2.0 oz/cwt or more, 2.5 oz/cwt or more, 3.0 oz/cwt or more, 3.5 oz/cwt or more, 4.0 oz/cwt or more, 4.5 oz/cwt or more, or 5.0 oz/cwt or more.

Embodiments of the present invention are directed to a method of any of the previous four paragraphs wherein the seed treatment composition is applied to a seed in a single application step or in multiple application steps, such as one, two, three or more application steps.

Embodiments of the present invention are directed to seeds treated by a method of any of the previous five paragraphs, wherein the seed comprises corn seed, cotton seed, sorghum seed, oat seed, rye seed, barley seed, soybean seed, vegetable seed, wheat seed, sugarbeet seed, rice, sunflower seed, lettuce seed, and/or spinach seed, such as sweet corn (for example, zea mays convar. saccharata var. Rugosa), silver queen corn, golden bantam, early sunglow, Indian corn, sugar corn, pole corn, field corn, dent corn, flint corn, flour corn, blue corn (for example, *Zea mays amylacea*), popcorn, and waxy corn.

Embodiments of the present invention are directed to a kit comprising, consisting essentially of, or consisting of any of any of the treatment compositions disclosed herein, such as where the kit provides instructions or guidance regarding the use of any of the compositions or methods described herein.

Embodiments of the present invention are also directed to use of any of the compositions described herein to reduce active agent dust exposure to an insect, such as a bee (such as such as, but not limited to, a Western honey bee, European honey bee (*Apis mellifera*), or Africanized honey bee), by applying a composition described herein to a seed.

EXAMPLES

Example 1

Seed treatment compositions were prepared using the ingredients and amounts (in milliliters) listed in Table 1. In each case, the listed ingredients were added to a suitable container and then mixed using a glass rod stirrer until a homogeneous mixture was obtained.

TABLE 1

| Ingredient | Example | | | | | |
| --- | --- | --- | --- | --- | --- | --- |
| | 1A | 1B | 1C | 1D | 1E | 1F |
| Active ingredient mixture[1] | 27.91 | 27.92 | 27.92 | 27.92 | 27.92 | 27.92 |
| Water | 21.77 | 25.89 | 21.99 | 19.99 | 19.99 | 19.15 |
| Commercial polymeric seed coating[2] | 22.18 | — | — | — | — | — |
| Seed coating blank[3] | — | 17.17 | 17.17 | 17.17 | 17.17 | 17.17 |
| IMPRANIL DLU[4] | — | — | 3.90 | — | — | — |
| IMPRANIL DLN[5] | — | — | — | 5.90 | — | — |
| IMPRANIL DL 2611[6] | — | — | — | — | 5.90 | — |
| BAYBOND PU 406[7] | — | — | — | — | — | 6.74 |

| Ingredient | Example | | | | | |
| --- | --- | --- | --- | --- | --- | --- |
| | 1G | 1H | 1I | 1J | 1K | 1L |
| Active ingredient mixture[1] | 27.91 | 27.92 | 27.92 | 27.92 | 27.92 | 27.91 |
| Water | 21.41 | 21.68 | 17.24 | 21.94 | 20.01 | 20.01 |
| Seed coating blank[3] | 17.17 | 17.17 | 17.17 | 17.17 | 17.17 | 17.17 |
| IMPRANIL DL 2611[6] | — | — | — | — | 5.90 | 5.90 |
| DISPERCOLL U XP 2699[8] | 4.48 | — | — | — | — | — |
| DISPERCOLL C 84[9] | — | 4.21 | — | — | — | — |
| BAYBOND PU 330[10] | — | — | 8.65 | — | — | — |
| IMPRANIL XP 1537[11] | — | — | — | 3.95 | — | — |

[1]A liquid mixture of VORTEX fungicide, TRILEX fungicide, PONCHO/VOTIVO insecticide, and red dye, Bayer CropScience LLP.
[2]PERIDIAM SEED FINISHER 1006, Bayer CropScience LLP, which is a multifunctional seed coating that is a chemical mixture composed of a dispersion of a binder comprising carboxylated styrene-butadiene polymer in water, along with other ingredients, such as suspending agents, surfactants, emulsifiers, dispersants, pigments, antimicrobial preservatives, and wax powder.
[3]Same composition as Commercial polymeric seed coating but without the presence of the carboxylated styrene-butadiene polymer binder.
[4]An anionic aliphatic polyether/polycarbonate polyurethane dispersion in water, 60% by weight non-volatile content, Covestro LLC.
[5]An anionic aliphatic polyester-polyurethane dispersion in water, 40% by weight non-volatile content, Covestro LLC, which was used as a comparative example-See U.S. Published Patent Application No. 2014/0274685 A1.
[6]An anionic aliphatic polyester-polyurethane dispersion in water, 40% by weight non-volatile content, Covestro LLC.
[7]A non-ionic polyurethane polymer dispersed in water, 34.5% by weight non-volatile content, Covestro LLC.
[8]An aqueous polyurethane dispersion, 55% by weight polymer content, Covestro LLC.
[9]An aqueous dispersion of poly-2-chlorobutadiene-1,3, 55% by weight polymer content, Covestro LLC.
[10]An anionic/non-ionic polyester polyurethane resin dispersed in water, 30% by weight non-volatile content, Covestro LLC.
[11]An anionic polyester polyurethane resin dispersed in water, 60% by weight non-volatile content, Covestro LLC.

Treatment of Corn Seeds

For each of the compositions of Examples 1A-1J, 3.31 pounds (1.5 kg) of corn was placed into a laboratory seed treater bowl equipped with a foot pedal to spin the bowl. While the bowl was spinning, 15.7 mL of the seed treatment composition was added to the treater using a 25 mL plastic syringe. Once the seed treatment composition was added and thoroughly mixed with the corn for about 30 to 60 seconds, the corn was discharged from the treater. Seed treatments for each composition was done twice for each type of corn (Seed A and Seed B) to obtain 6.62 pounds (3.0 kg) of treated corn seeds. "Seed A" refers to hybrid dent corn seed of 1564 seeds per pound with a size of 25\20 F (flat). "Seed B" refers to hybrid dent corn seed of 1729 seeds per pound with a size of 20\16 R (round).

Each of the Examples 1E, 1K, and 1L had the same composition, but the seed treatment process differed. The seed treatment process for Example 1E was as described above.

In the case of Example 1K, 3.31 pounds (1.5 kg) of corn was placed into a laboratory seed treater bowl equipped with a foot pedal to spin the treater bowl. A mixture of the water and IMPRANIL DL 2611 dispersion was pre-made, while the other seed treatment components (the active ingredient mixture and seed coating blank) were combined separately. While the bowl was spinning, 9.9 mL of active ingredient mixture and seed coating blank combination was first added to the treater containing the spinning corn seed. Then, 5.7 mL of the water and IMPRANIL DL 2611 dispersion combination was added to the corn seed under spinning using a 25 mL plastic syringe. The treated corn seed was thoroughly mixed for about 30 to 60 seconds, and the corn was discharged from the treater. Seed treatments were done twice for each type of corn (Seed A and Seed B) to obtain 6.62 pounds (3.0 kg) of treated corn seeds.

In the case of Example 1L, 3.31 pounds (1.5 kg) of corn was placed into a laboratory seed treater bowl equipped with a foot pedal to spin the treater bowl. A mixture of the seed coating blank and IMPRANIL DL 2611 dispersion was pre-made, while the other seed treatment components (the active ingredient mixture and water) were combined separately. While the bowl was spinning, 10.6 mL of active ingredient/water mixture was first added to the treater containing the spinning corn seed. Then, 5.1 mL of the seed coating blank/IMPRANIL DL 2611 dispersion combination was added to the corn seed under spinning using a 25 mL plastic syringe. The treated corn seed was thoroughly mixed for about 30 to 60 seconds, and the corn was discharged from the treater. Seed treatments were done twice for each type of corn (Seed A and Seed B) to obtain 6.62 pounds (3.0 kg) of treated corn seeds.

The treated corn seed was tested for wet and dry flowability, dust, and plantability. Wet flowability was determined by passing 6.62 pounds (3.0 kg) of freshly treated corn seed through a test funnel having a 1⅝ inch diameter orifice. Flowability was determined as the time (in seconds) that it took for all of the corn to pass through the funnel. Recorded results are the average of three measurements. Dry flowability was determined in the same manner as wet flowability except that the test was conducted 24 hours after the seed treatment was completed. Dust (reported as grams of dust per 100 grams of corn seed) was measured using a Heubach Dustmeter (Type I) according to German Industry Standard DIN 55 992, Part I. Percent singulation was determined with a METERMAX Ultra Test Stand from Precision Planting LLC having a John Deere MAXEMERGE Vacuum Meter attached. Three runs of 1000 seeds each were conducted and the recorded results reflect the average of the three runs. The test stand parameters were set to simulate the planting of 35,000 seeds per acre (4046 m$^2$) at a speed of 5 miles (8.05 km) per hour with 30 inch (76.2 cm) rows. Results are set forth in Table 2.

TABLE 2

| Example | Wet Flow Seed A | Wet Flow Seed B | Dry Flow Seed A | Dry Flow Seed B | Dust Seed A | Dust Seed B | Percent Singulation Seed A | Percent Singulation Seed B |
|---|---|---|---|---|---|---|---|---|
| 1A | 15.37 | 15.62 | 12.32 | 12.32 | 0.0005 | 0.0002 | 99.2 | 99.5 |
| 1b | 16.43 | 16.18 | 13.21 | 13.04 | 0.0032 | 0.0022 | 97.8 | 99.2 |
| 1C | 17.51 | 16.60 | 13.68 | 13.17 | 0.0005 | 0.0005 | 96.2 | 98.7 |
| 1D | 16.87 | 15.94 | 12.70 | 12.70 | 0.0003 | 0.0004 | 95.1 | 98.8 |
| 1E | 16.49 | 15.67 | 12.17 | 12.17 | 0.0007 | 0.0006 | 99.0 | 99.7 |
| 1F | 16.86 | 16.29 | 13.13 | 12.65 | 0.0010 | 0.0008 | 98.3 | 99.5 |
| 1G | 17.10 | 16.27 | 13.85 | 13.31 | 0.0013 | 0.0008 | 88.4 | 98.1 |
| 1H | 17.49 | 16.30 | 13.69 | 12.98 | 0.0006 | 0.0004 | 93.5 | 98.8 |
| 1I | 17.18 | 16.14 | 13.42 | 12.72 | 0.0004 | 0.0002 | 78.2 | 96.4 |
| 1J | 15.74 | 15.57 | 12.79 | 12.32 | 0.0006 | 0.0006 | 97.7 | 99.6 |
| 1K | 15.17 | 14.48 | 12.54 | 11.80 | 0.0007 | 0.0004 | 98.7 | 99.7 |
| 1L | 14.90 | 14.79 | 12.21 | 11.92 | 0.0005 | 0.0005 | 99.1 | 99.8 |

Example 2

Seed treatment compositions were prepared using the ingredients and amounts (in milliliters) listed in Table 3. In each case, the listed ingredients were added to a suitable container and then mixed using a glass rod stirrer until a homogeneous mixture was obtained.

TABLE 3

| Ingredient | Example 2A | 2B | 2C | 2D | 2E |
|---|---|---|---|---|---|
| Active ingredient mixture[1] | 27.91 | 27.92 | 27.92 | 27.92 | 27.92 |
| Water | 21.77 | 25.89 | 19.99 | 20.01 | 20.01 |
| Commercial polymeric seed coating[2] | 22.18 | — | — | — | — |
| Seed coating blank[3] | — | 17.17 | 17.17 | 17.17 | 17.17 |
| BAYHYDROL UH XP 2719[12] | — | — | 5.90 | 5.90 | 5.90 |

[12] An aliphatic, polyester-based, anionic polyurethane dispersion in water, 40% by weight non-volatile content, Covestro LLC.

Treatment of Corn Seeds

For each of the compositions of Examples 2A-2C, corn seeds were treated in the manner described above for Examples 1A-1J.

In the case of Example 2D, 3.31 pounds (1.5 kg) of corn was placed into a laboratory seed treater bowl equipped with a foot pedal to spin the treater bowl. A mixture of the water and BAYHYDROL UH XP 2719 dispersion was pre-made, while the other seed treatment components (the active ingredient mixture and seed coating blank) were combined separately. While the bowl was spinning, 9.9 mL of the active ingredient/seed coating blank mixture was first added to the treater containing the spinning corn seed. Then, 5.7 mL of the water/BAYHYDROL UH XP 2719 dispersion combination was added to the corn seed under spinning using a 25 mL plastic syringe. The treated corn seed was mixed thoroughly for about 30 to 60 seconds, and the corn was discharged from the treater. Seed treatments were done twice for each type of corn (Seed A and Seed B) to obtain 6.62 pounds (3.0 kg) of treated corn seeds.

In the case of Example 2E, 3.31 pounds (1.5 kg) of corn was placed into a laboratory seed treater bowl equipped with a foot pedal to spin the treater bowl. A mixture of the seed coating blank and BAYHYDROL UH XP 2719 dispersion was pre-made, while the other seed treatment components (the water and the active ingredient mixture) were combined separately. While the bowl was spinning, 10.6 mL of the active ingredient mixture/water combination was first added to the treater containing the spinning corn seed. Then, 5.1 mL of the seed coating blank/BAYHYDROL UH XP 2719 dispersion combination was added to the corn seed under spinning using a 25 mL plastic syringe. The treated corn seed was mixed thoroughly for about 30 to 60 seconds, and the corn was discharged from the treater. Seed treatments were done twice for each type of corn (Seed A and Seed B) to obtain 6.62 pounds (3.0 kg) of treated corn seeds. "Seed A" and "Seed B" were as described in Example 1.

The treated corn seed was tested for wet flowability, dry flowability, dust, and plantability as described above in Example 1. Results are set forth in Table 4.

TABLE 4

| Ex-ample | Wet Flow Seed A | Wet Flow Seed B | Dry Flow Seed A | Dry Flow Seed B | Dust Seed A | Dust Seed B | Percent Singulation Seed A | Percent Singulation Seed B |
|---|---|---|---|---|---|---|---|---|
| 2A | 15.25 | 15.42 | 12.66 | 12.44 | 0.0004 | 0.0002 | 98.9 | 99.7 |
| 2B | 16.07 | 16.15 | 13.69 | 13.41 | 0.0024 | 0.0018 | 97.2 | 99.2 |
| 2C | 15.64 | 15.28 | 12.91 | 12.40 | 0.0009 | 0.0008 | 98.8 | 99.9 |
| 2D | 15.19 | 15.26 | 12.66 | 12.72 | 0.0011 | 0.0010 | 98.7 | 99.7 |
| 2E | 14.44 | 14.31 | 12.43 | 12.28 | 0.0009 | 0.0006 | 99.3 | 99.7 |

Example 3

Seed treatment compositions were prepared using the ingredients and amounts (in milliliters) listed in Table 5 using the procedure described above in Example 1.

TABLE 5

| Ingredient | 3A | 3B | 3C | 3D | 3E | 3F | 3G |
|---|---|---|---|---|---|---|---|
| Active ingredient mixture[1] | 27.91 | 27.92 | 27.92 | 27.92 | 27.92 | 27.92 | 27.92 |
| Water | 21.77 | 25.89 | 21.01 | 21.19 | 21.19 | 20.66 | 21.45 |
| Commercial polymeric seed coating[2] | 22.18 | — | — | — | — | — | — |
| Seed coating blank[3] | — | 17.17 | 17.17 | 17.17 | 17.17 | 17.17 | 17.17 |
| STYROFAN NX 6690 X[13] | — | — | 4.88 | — | — | — | — |
| IMPRANIL LP DSB 1069[14] | — | — | — | 4.70 | — | — | — |
| DISPERCOLL U 54[15] | — | — | — | — | 4.70 | — | — |
| DISPERCOLL U 8755[16] | — | — | — | — | — | 5.23 | — |
| IMPRANIL DL 2611[6] | — | — | — | — | — | — | 4.44 |

| Ingredient | 3H | 3I | 3J | 3K | 3L | 3M | 3N |
|---|---|---|---|---|---|---|---|
| Active ingredient mixture[1] | 27.93 | 27.92 | 27.92 | 27.92 | 27.92 | 27.92 | 27.92 |
| Water | 19.10 | 17.55 | 18.04 | 19.41 | 21.45 | 18.53 | 18.53 |
| Seed coating blank[3] | 17.17 | 17.17 | 17.17 | 17.17 | 17.17 | 17.17 | 17.17 |
| BAYBOND PU 330[10] | 2.88 | 3.02 | 6.21 | 6.48 | — | — | — |
| BAYHYDROL UH XP 2719[12] | 1.95 | 5.32 | — | — | 4.44 | 7.36 | 2.13 |
| IMPRANIL DL 2611[6] | 1.95 | — | 1.64 | — | — | — | 5.23 |

| Ingredient | 3O | 3P | 3Q | 3R | 3S | 3T | 3U |
|---|---|---|---|---|---|---|---|
| Active ingredient mixture[1] | 27.92 | 27.91 | 27.92 | 27.93 | 27.93 | 27.92 | 27.91 |
| Water | 18.53 | 18.53 | 15.95 | 19.10 | 21.45 | 20.83 | 17.64 |
| Seed coating blank[3] | 17.17 | 17.17 | 17.17 | 17.17 | 17.17 | 17.17 | 17.17 |
| BAYBOND PU 330[10] | — | — | 8.12 | 2.88 | — | 1.95 | 2.71 |
| BAYHYDROL UH XP 2719[12] | — | 5.37 | 1.82 | 1.95 | 1.15 | 3.11 | — |
| IMPRANIL DL 2611[6] | 7.36 | 2.00 | — | 1.95 | 3.28 | — | 5.55 |

| Ingredient | 3V | 3W | 3X | 3Y | 3Z | 3AA | 3BB |
|---|---|---|---|---|---|---|---|
| Active ingredient mixture[1] | 27.92 | 27.92 | 27.92 | 27.92 | 27.93 | 27.91 | 27.91 |
| Water | 21.45 | 20.83 | 20.43 | 15.07 | 18.08 | 19.10 | 16.00 |
| Seed coating blank[3] | 17.17 | 17.17 | 17.17 | 17.17 | 17.17 | 17.17 | 17.17 |
| BAYBOND PU 330[10] | — | 1.95 | 3.24 | 10.82 | 6.03 | 2.88 | 7.90 |
| BAYHYDROL UH XP 2719[12] | 3.11 | — | 1.11 | — | 1.77 | 1.95 | — |
| IMPRANIL DL 261[16] | 1.33 | 3.11 | 1.11 | — | — | 1.95 | 2.00 |

[13] Carboxylated styrene/butadiene dispersion in water, 52-53% by weight solids content, BASF Corporation.
[14] An anionic, aliphatic, polyether-polyurethane dispersion in water, 50% by weight non-volatile content, Covestro LLC.
[15] An aqueous anionic dispersion of a polyurethane, 50% by weight non-volatile content, Covestro LLC.
[16] An aqueous anionic dispersion of a polyurethane, 45% by weight non-volatile content, Covestro LLC.

Treatment of Corn Seeds

For each of the compositions of Examples 3A-3BB, corn seeds were treated in the manner described above for Examples 1A-1J. "Seed A" and "Seed B" were as described in Example 1. The treated corn seed was tested for wet flowability, dry flowability, dust, and plantability as described above in Example 1. Results are set forth in Table 6.

TABLE 6

| Ex-ample | Wet Flow Seed A | Wet Flow Seed B | Dry Flow Seed A | Dry Flow Seed B | Dust Seed A | Dust Seed B | Percent Singulation Seed A | Percent Singulation Seed B |
|---|---|---|---|---|---|---|---|---|
| 3A | 15.56 | 15.46 | 13.36 | 12.80 | 0.0004 | 0.0002 | 98.7 | 99.7 |
| 3B | 16.55 | 15.76 | 14.15 | 13.25 | 0.0024 | 0.0014 | 97.9 | 99.2 |
| 3C | 15.52 | 15.36 | 12.72 | 12.77 | 0.0003 | 0.0002 | 99.4 | 99.7 |
| 3D | 16.70 | 16.02 | 14.22 | 13.44 | 0.0003 | 0.0002 | 95.6 | 99.1 |
| 3E | 17.01 | 16.10 | 14.14 | 13.14 | 0.0011 | 0.0005 | 96.8 | 99.7 |
| 3F | 17.27 | 15.35 | 14.37 | 13.08 | 0.0007 | 0.0006 | 97.5 | 99.4 |
| 3G | 16.31 | 14.81 | 13.57 | 12.54 | 0.0005 | 0.0005 | 98.8 | 99.7 |
| 3H | 17.04 | 15.54 | 14.20 | 13.07 | 0.0004 | 0.0003 | 98.5 | 99.6 |
| 3I | 16.38 | 15.67 | 13.85 | 13.02 | 0.0009 | 0.0006 | 98.1 | 99.7 |
| 3J | 17.40 | 16.01 | 14.31 | 12.97 | 0.0001 | 0.0002 | 97.0 | 99.4 |
| 3K | 17.39 | 16.01 | 14.42 | 13.35 | 0.0003 | 0.0001 | 95.1 | 99.4 |
| 3L | 16.73 | 15.37 | 14.05 | 13.37 | 0.0030 | 0.0019 | 97.4 | 99.3 |
| 3M | 17.00 | 15.83 | 14.26 | 13.61 | 0.0038 | 0.0023 | 98.1 | 99.2 |
| 3N | 16.48 | 15.45 | 13.77 | 12.80 | 0.0004 | 0.0006 | 98.7 | 99.8 |
| 3O | 16.54 | 15.01 | 13.32 | 12.53 | 0.0005 | 0.0004 | 98.8 | 99.7 |
| 3P | 16.95 | 15.73 | 14.06 | 13.38 | 0.0015 | 0.0016 | 98.0 | 99.7 |
| 3Q | 17.69 | 15.27 | 14.45 | 12.93 | 0.0003 | 0.0001 | 88.5 | 98.3 |
| 3R | 16.46 | 15.57 | 13.63 | 12.72 | 0.0002 | 0.0002 | 98.5 | 99.7 |
| 3S | 16.35 | 15.14 | 13.56 | 12.78 | 0.0006 | 0.0005 | 98.6 | 99.6 |
| 3T | 17.17 | 15.53 | 14.05 | 13.16 | 0.0014 | 0.0011 | 97.5 | 99.3 |
| 3U | 16.95 | 15.10 | 13.30 | 12.57 | 0.0001 | 0.0006 | 98.7 | 99.8 |

TABLE 6-continued

| Ex-ample | Wet Flow | | Dry Flow | | Dust | | Percent Singulation | |
|---|---|---|---|---|---|---|---|---|
| | Seed A | Seed B | Seed A | Seed B | Seed A | Seed B | Seed A | Seed B |
| 3V | 17.05 | 15.59 | 14.12 | 13.12 | 0.0016 | 0.0008 | 97.5 | 99.8 |
| 3W | 16.84 | 15.64 | 13.37 | 12.99 | 0.0004 | 0.0004 | 98.4 | 99.9 |
| 3X | 17.15 | 16.03 | 13.91 | 13.19 | 0.0004 | 0.0003 | 97.7 | 99.8 |
| 3Y | 18.78 | 16.36 | 14.44 | 13.45 | 0.0001 | 0.0001 | 71.7 | 94.2 |
| 3Z | 17.18 | 16.33 | 14.05 | 13.12 | 0.0005 | 0.0001 | 94.3 | 99.4 |
| 3AA | 16.27 | 16.05 | 13.45 | 13.28 | 0.0006 | 0.0002 | 98.2 | 99.6 |
| 3BB | 16.78 | 16.40 | 13.76 | 13.26 | 0.0002 | 0.0002 | 90.9 | 98.5 |

Example 4

Seed treatment compositions were prepared using the ingredients and amounts (in milliliters) listed in Table 7 using the procedure described above in Example 1.

TABLE 7

| Ingredient | Example | | | | | | |
|---|---|---|---|---|---|---|---|
| | 4A | 4B | 4C | 4D | 4E | 4F | 4G |
| Active ingredient mixture[1] | 27.92 | 27.92 | 27.92 | 27.92 | 27.92 | 27.92 | 27.92 |
| Water | 20.88 | 25.89 | 19.99 | 22.92 | 20.39 | 19.59 | 22.74 |
| Commercial polymeric seed coating[2] | 22.18 | — | — | — | — | — | — |
| Seed coating blank[3] | — | 17.17 | 17.17 | 17.17 | 17.17 | 17.17 | 17.17 |
| Polyethylene Wax[17] | — | — | — | — | 2.53 | — | — |
| BAYBOND PU 330[10] | — | — | — | — | — | 1.29 | 0.67 |
| IMPRANIL DL 2611[6] | — | — | 5.90 | 2.97 | 2.97 | 5.01 | 2.48 |

| Ingredient | Example | | | | | | |
|---|---|---|---|---|---|---|---|
| | 4H | 4I | 4J | 4K | 4L | 4M | 4N |
| Active ingredient mixture[1] | 27.92 | 27.92 | 27.92 | 27.92 | 27.92 | 27.92 | 27.92 |
| Water | 20.21 | 18.70 | 22.30 | 19.77 | 18.84 | 22.34 | 19.81 |
| Seed coating blank[3] | 17.17 | 17.17 | 17.17 | 17.17 | 17.17 | 17.17 | 17.17 |
| Polyethylene Wax[17] | 2.53 | — | — | 2.53 | — | — | 2.53 |
| BAYBOND PU 330[10] | 0.67 | 4.26 | 2.13 | 2.13 | 3.81 | 1.91 | 1.91 |
| BAYHYDROL UH XP 2719[12] | — | — | — | — | 0.58 | 0.31 | 0.31 |
| IMPRANIL DL 2611[6] | 2.48 | 2.93 | 1.46 | 1.46 | 2.66 | 1.33 | 1.33 |

[17]MICHEM Wax 437, Michelman, Inc.

Treatment of Corn Seeds

For each of the compositions of Examples 4A-4N, corn seeds were treated in the manner described above for Examples 1A-1J. "Seed A" and "Seed B" were as described in Example 1. "Seed C" refers to hybrid dent corn seed of 2034 seeds per pound with a size of 20\16 F (flat). The treated corn seed was tested for wet flowability, dry flowability, dust, and plantability as described above in Example 1. Results are set forth in Table 8.

TABLE 8

| Example | Wet Flow | | | Dry Flow | | |
|---|---|---|---|---|---|---|
| | Seed A | Seed B | Seed C | Seed A | Seed B | Seed C |
| 4A | 16.09 | 16.13 | 15.74 | 13.44 | 13.18 | 13.17 |
| 4B | 16.52 | 17.02 | 16.63 | 13.86 | 14.10 | 14.46 |
| 4C | 16.13 | 16.20 | 15.60 | 13.26 | 13.27 | 13.28 |
| 4D | 16.79 | 16.66 | 16.39 | 13.74 | 13.62 | 13.70 |
| 4E | 16.66 | 16.78 | 16.51 | 13.97 | 14.09 | 14.06 |
| 4F | 16.45 | 16.52 | 16.56 | 13.69 | 13.58 | 13.54 |
| 4G | 16.94 | 16.55 | 17.02 | 13.92 | 13.59 | 13.99 |
| 4H | 16.73 | 16.65 | 16.85 | 14.06 | 13.84 | 14.37 |
| 4I | 16.93 | 17.07 | 17.01 | 13.73 | 13.73 | 13.74 |
| 4J | 16.91 | 16.87 | 16.75 | 14.01 | 13.81 | 14.03 |
| 4K | 16.93 | 16.95 | 17.25 | 14.04 | 13.75 | 14.28 |
| 4L | 17.67 | 17.07 | 17.70 | 14.10 | 13.72 | 14.13 |
| 4M | 17.29 | 17.11 | 16.87 | 14.12 | 13.82 | 14.08 |
| 4N | 17.09 | 16.67 | 17.22 | 14.33 | 13.84 | 14.12 |

| Example | Dust | | | % Singulation | | |
|---|---|---|---|---|---|---|
| | Seed A | Seed B | Seed C | Seed A | Seed B | Seed C |
| 4A | 0.0004 | 0.0003 | 0.0008 | 98.7 | 99.2 | 96.9 |
| 4B | 0.0024 | 0.0020 | 0.0056 | 97.6 | 97.4 | 91.7 |
| 4C | 0.0005 | 0.0005 | 0.0017 | 98.9 | 98.2 | 96.9 |
| 4D | 0.0008 | 0.0007 | 0.0029 | 98.3 | 98.8 | 95.7 |
| 4E | 0.0008 | 0.0009 | 0.0027 | 98.8 | 98.5 | 95.9 |
| 4F | 0.0010 | 0.0004 | 0.0013 | 98.8 | 98.8 | 96.4 |
| 4G | 0.0010 | 0.0007 | 0.0021 | 98.4 | 98.8 | 95.1 |
| 4H | 0.0008 | 0.0008 | 0.0020 | 98.1 | 98.4 | 94.1 |
| 4I | 0.0007 | 0.0004 | 0.0009 | 98.0 | 98.1 | 94.5 |
| 4J | 0.0009 | 0.0006 | 0.0018 | 97.4 | 98.6 | 94.1 |
| 4K | 0.0007 | 0.0011 | 0.0016 | 98.3 | 98.4 | 94.8 |
| 4L | 0.0004 | 0.0004 | 0.0010 | 97.8 | 97.9 | 92.7 |
| 4M | 0.0012 | 0.0010 | 0.0020 | 97.3 | 97.7 | 94.0 |
| 4N | 0.0009 | 0.0012 | 0.0021 | 98.0 | 98.4 | 94.7 |

Example 5

Films were produced from various polymeric dispersions using the ingredients and amounts (percent by weight based on resin solids) listed in Table 9. For evaluation of microhardness and glass transition temperature, a test sample was prepared by applying 8 mils (203 μm) wet film thickness of the formulation onto a 3"×6" glass panel. The formulation was left to dry for 24 hours after application. Microhardness (Marten's hardness) measurements were done using Fischerscope H100C instrument with the method described in DIN 14577. Microhardness readings were taken under a 30 mN test load run to a maximum of 5 μm indentation depth over a 20 second application time. Results reported are an average of three readings for each formulation. Glass transition temperature ($T_g$) was evaluated using Differential scanning calorimetry (DSC) conducted with Perkin Elmer DSC7 using a liquid nitrogen bath. The samples were evaluated from −100° C. to 100° C., cooled, and reheated using a 20° C./minute ramp rate. For evaluation of tensile strength and percent elongation, samples were prepared by applying 10 mils (254 μm) wet film thickness of the formulation onto a 6"×12" glass panel. The formulation was left to dry for 24 hours after application. The panel was then soaked in warm water to peel it from the glass substrate. Once peeled, the film was dried with a paper towel. Using a die cutter, dog-bone samples were cut and tensile strength and percent elongation were measured using an INSTRON 4444 apparatus at a grip distance of 2.5" at a crosshead speed of 20 inch/minute. Results reported for percent elongation and tensile strength are an average of three readings for each formulation. Results are in Table 9.

TABLE 9

| Ingredient | Example | | | | | | |
|---|---|---|---|---|---|---|---|
| | 5A | 5B | 5C | 5D | 5E | 5F | 5G |
| STYROFAN NX 6690 X[13] | 100 | — | — | — | — | — | — |
| IMPRANIL DLU[4] | — | 100 | — | — | — | — | — |
| IMPRANIL DLN[5] | — | — | 100 | — | — | — | — |
| IMPRANIL DL 2611[6] | — | — | — | 100 | — | — | — |
| BAYBOND PU 406[7] | — | — | — | — | 100 | — | — |
| DISPERCOLL U XP 2699[8] | — | — | — | — | — | 100 | — |
| DISPERCOLL C 84[9] | — | — | — | — | — | — | 100 |
| Test Results | | | | | | | |
| Fischer Microhardness (N/mm$^2$) | 2.3 | 1.1 | 0.6 | 12.3 | 2.2 | 1.4 | 2.2 |
| Glass Transition Temperature (° C.) | 11 | −65 | −47 | −31 | −64 | −58 | −45 |
| Percent Elongation | 301 | 700 | 700 | 225 | 275 | 800 | 800 |
| Tensile Strength (lb/in$^2$(kg/cm$^2$)) | 1082 (76) | 3600 (253) | 2900 (204) | 5048 (355) | 1200 (84) | 1500 (105) | 2900 (204) |

| Ingredient | Example | | | | | | |
|---|---|---|---|---|---|---|---|
| | 5H | 5I | 5J | 5K | 5L | 5M | 5N |
| IMPRANIL DL 2611[6] | — | — | — | — | — | — | 33 |
| BAYBOND PU 330[10] | 100 | — | — | — | — | — | 33 |
| IMPRANIL XP 1537[11] | — | 100 | — | — | — | — | — |
| BAYHYDROL UH XP 2719[12] | — | — | 100 | — | — | — | 33 |
| IMPRANIL LP DSB 1069[14] | — | — | — | 100 | — | — | — |
| DISPERCOLL U 54[15] | — | — | — | — | 100 | — | — |
| DISPERCOLL U 8755[16] | — | — | — | — | — | 100 | — |
| Test Results | | | | | | | |
| Fischer Microhardness (N/mm$^2$) | 0.4 | 0.7 | 45.4 | 0.8 | 11.9 | 11.1 | 8.6 |
| Glass Transition Temperature (° C.) | −48 | −4 | −46 | −79 | −49 | −53 | −47 |
| Percent Elongation | 700 | 650 | 44 | 800 | 820 | 570 | 318 |
| Tensile Strength (lb/in$^2$(kg/cm$^2$)) | 130 (9) | 2175 (153) | 2471 (174) | 2900 (204) | 5600 (394) | 3400 (239) | 1335 (94) |

| Ingredient | Example | | | | | | |
|---|---|---|---|---|---|---|---|
| | 5O | 5P | 5Q | 5R | 5S | 5T | 5U |
| IMPRANIL DL 2611[6] | — | 28 | 72 | 27 | — | 74 | — |
| BAYBOND PU 330[10] | 28 | 72 | — | — | 75 | — | 30 |
| BAYHYDROL UH XP 2719[12] | 72 | — | 28 | 73 | 25 | 26 | 70 |
| Test Results | | | | | | | |
| Fischer Microhardness (N/mm$^2$) | 20.1 | 0.7 | 19.9 | 34.8 | 2.0 | 19.5 | 19.2 |
| Glass Transition Temperature (° C.) | −46 | −47 | −35 | −46 | −47 | −38 | −46 |
| Percent Elongation | 300 | 255 | 155 | 236 | NA* | 230 | 323 |
| Tensile Strength (lb/in$^2$(kg/cm$^2$)) | 2452 (172) | 377 (27) | 3547 (249) | 4175 (294) | NA* | 4575 (322) | 2959 (208) |

| Ingredient | Example | | | | | | |
|---|---|---|---|---|---|---|---|
| | 5V | 5W | 5X | 5Y | 5Z | 5AA | 5BB |
| IMPRANIL DL 2611[6] | 75 | 30 | 70 | 25 | — | 27 | 85 |
| BAYBOND PU 330[10] | 25 | — | 30 | 50 | 70 | 73 | 15 |
| BAYHYDROL UH XP 2719[12] | — | 70 | — | 25 | 30 | — | — |
| Test Results | | | | | | | |
| Fischer Microhardness (N/mm$^2$) | 4.5 | 34.4 | 3.5 | 4.7 | 3.3 | 0.8 | 8.2 |
| Glass Transition Temperature (° C.) | −45 | −42 | −46 | −46 | −46 | −47 | −49 |
| Percent Elongation | 262 | 210 | 300 | 373 | 471 | NA* | 273 |
| Tensile Strength (lb/in$^2$(kg/cm$^2$)) | 3156 (222) | 4688 (330) | 3036 (213) | 2382 (167) | 942 (66) | NA* | 3074 (216) |

| Ingredient | Example | |
|---|---|---|
| | 5CC | 5DD |
| IMPRANIL DL 2611[6] | 50 | 45 |
| BAYBOND PU 330[10] | 50 | 45 |
| BAYHYDROL UH XP 2719[12] | — | 10 |
| Test Results | | |
| Fischer Microhardness (N/mm$^2$) | 2.5 | 3.7 |
| Glass Transition Temperature (° C.) | −55 | −55 |

TABLE 9-continued

| | | |
|---|---|---|
| Percent Elongation | 383 | 364 |
| Tensile Strength (lb/in$^2$(kg/cm$^2$)) | 927 | 1176 |
| | (65) | (83) |

*A film sufficient for percent elongation and tensile strength evaluation was not produced.

Example 6

The data from Examples 1-4 was analyzed using multi-variable regression analysis using JMP 11.1 software (SAS Institute, Cary, N.C.). Each model was built with the resin loading and the treatment (PUD or blend of PUD's) as main effects, with blocking on Example number and seed type (only type A and type B were used). Because of the nature of the data, the following transformations of the responses were used: (i) log of the dust and (ii) logit of singulation. No transformation was used for the flow data. Using the estimated parameters from the model, a predicted response was generated for each treatment at a loading of 17 g resin per 100 pounds of corn. Results are set forth in Table 10.

TABLE 10

| | Example | | | | | | |
|---|---|---|---|---|---|---|---|
| Ingredient | 6A | 6B | 6C | 6D | 6E | 6F | 6G |
| STYROFAN NX 6690 X[13] | 100 | — | — | — | — | — | — |
| Blank | — | — | — | — | — | — | — |
| IMPRANIL DLU[4] | — | — | 100 | — | — | — | — |
| IMPRANIL DLN[5] | — | — | — | 100 | — | — | — |
| IMPRANIL DL 2611[6] | — | — | — | — | 100 | — | — |
| BAYBOND PU 406[7] | — | — | — | — | — | 100 | — |
| DISPERCOLL U XP 2699[8] | — | — | — | — | — | — | 100 |
| | Test Results | | | | | | |
| Wet Flow (seconds) | 15.55 | 16.48 | 17.31 | 16.64 | 15.6 | 16.82 | 16.96 |
| Dry Flow (seconds) | 12.75 | 13.34 | 13.92 | 13.22 | 12.7 | 13.39 | 14.05 |
| Dust | .00029 | .001 | .00035 | .00029 | .00045 | .00064 | .00067 |
| Percent singulation | 99.43 | 98.18 | 97.90 | 97.76 | 99.45 | 99.18 | 95.16 |

| | Example | | | | | | |
|---|---|---|---|---|---|---|---|
| Ingredient | 6H | 6I | 6J | 6K | 6L | 6M | 6N |
| DISPERCOLL C 84[9] | 100 | — | — | — | — | — | — |
| BAYBOND PU 330[10] | — | 100 | — | — | — | — | — |
| IMPRANIL XP 1537[11] | — | — | 100 | — | — | — | — |
| BAYHYDROL UH XP 2719[12] | — | — | — | 100 | — | — | — |
| IMPRANIL LP DSB 1069[14] | — | — | — | — | 100 | — | — |
| DISPERCOLL U 54[15] | — | — | — | — | — | 100 | — |
| DISPERCOLL U 8755[16] | — | — | — | — | — | — | 100 |
| | Test Results | | | | | | |
| Wet Flow (seconds) | 17.14 | 16.98 | 15.89 | 15.80 | 16.25 | 16.45 | 16.20 |
| Dry Flow (seconds) | 13.85 | 13.59 | 13.07 | 13.18 | 13.50 | 13.31 | 13.39 |
| Dust | .00038 | .00015 | .00045 | .00171 | .00026 | .00073 | .00064 |
| Percent singulation | 97.45 | 94.26 | 99.17 | 99.16 | 98.15 | 99.01 | 98.80 |

| | Example | | | | | | |
|---|---|---|---|---|---|---|---|
| Ingredient | 6O | 6P | 6Q | 6R | 6S | 6T | 6U |
| IMPRANIL DL 2611[6] | 33 | — | 28 | 72 | 27 | — | 74 |
| BAYBOND PU 330[10] | 33 | 28 | 72 | — | — | 75 | — |
| BAYHYDROL UH XP 2719[12] | 33 | 72 | — | 28 | 73 | 25 | 26 |
| | Test Results | | | | | | |
| Wet Flow (seconds) | 16.05 | 15.88 | 16.60 | 15.82 | 16.20 | 16.33 | 15.67 |
| Dry Flow (seconds) | 13.06 | 13.16 | 13.31 | 13.02 | 13.45 | 13.42 | 12.78 |
| Dust | .00028 | .00088 | .00012 | .00058 | .00177 | .00025 | .00048 |
| Percent singulation | 99.29 | 99.33 | 98.76 | 99.54 | 99.38 | 96.19 | 99.17 |

| | Example | | | | | | |
|---|---|---|---|---|---|---|---|
| Ingredient | 6V | 6W | 6X | 6Y | 6Z | 6AA | 6BB |
| IMPRANIL DL 2611[6] | — | 75 | 30 | 70 | 25 | — | 27 |
| BAYBOND PU 330[10] | 30 | 25 | — | 30 | 50 | 70 | 73 |
| BAYHYDROL UH XP 2719[12] | 70 | — | 70 | — | 25 | 30 | — |

TABLE 10-continued

| Test Results | | | | | | | |
|---|---|---|---|---|---|---|---|
| Wet Flow (seconds) | 16.28 | 15.88 | 16.25 | 16.17 | 16.51 | 16.65 | 16.44 |
| Dry Flow (seconds) | 13.21 | 12.67 | 13.22 | 12.79 | 13.16 | 13.26 | 13.24 |
| Dust | .00097 | .00029 | .00090 | .00032 | .00028 | .00022 | .00024 |
| Percent singulation | 98.55 | 99.54 | 99.17 | 99.57 | 99.27 | 98.23 | 96.84 |

| | Example | | |
|---|---|---|---|
| Ingredient | 6CC | 6DD | 6EE |
| IMPRANIL DL 2611[6] | 85 | 50 | 45 |
| BAYBOND PU 330[10] | 15 | 50 | 45 |
| BAYHYDROL UH XP 2719[12] | — | — | 10 |
| Test Results | | | |
| Wet Flow (seconds) | 15.96 | 16.29 | 16.63 |
| Dry Flow (seconds) | 13.04 | 13.16 | 13.28 |
| Dust | .00052 | .00046 | .00052 |
| Percent singulation | 99.08 | 99.00 | 99.10 |

As a result of the foregoing, it is currently believed that seed treatment compositions comprising: (A) an aqueous polyurethane dispersion; and (B) an insecticide, a fungicide, a nematicide, and/or other pesticides, wherein the aqueous polyurethane dispersion forms a film exhibiting: (a) a microhardness of no more than 15 N/mm$^2$, (b) a glass transition temperature of −54° C. to −4° C., (c) a percent elongation of 44 to 820, and (d) a tensile strength of 130 lb/in$^2$ (0.9 (MPa) to 1300 lb/in$^2$ (9.0 MPa) can exhibit significantly reduced seed dust generation during planting, such as vacuum planting, as compared to when an identical treatment composition is used in which a polyolefin latex, such as a carboxylated styrene/butadiene polymer, is used as the polymeric component of the composition rather than the aqueous polyurethane dispersion or as compared to an identical treatment composition in which no polymeric component is used in the composition.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. An aqueous seed treatment composition comprising:
   (A) an aqueous polyurethane dispersion mixture; and
   (B) one or more insecticides, fungicides, nematicides and/or other pesticides, wherein the aqueous polyurethane dispersion mixture forms a film exhibiting:
   (a) a microhardness of no more than 15 N/mm$^2$,
   (b) a glass transition temperature, $T_g$ of −54° C. to −4° C.,
   (c) a percent elongation of 44 to 820, and
   (d) a tensile strength of 130 lb/in$^2$ to 1300 lb/in$^2$,
   wherein the seed is selected from the group consisting of corn seed, sorghum seed, oat seed, rye seed, barley seed, soybean seed, vegetable seed, wheat seed, sugarbeet seed, rice, sunflower seed, lettuce seed, and spinach seed,
   wherein the aqueous polyurethane dispersion mixture comprises at least two aqueous polyurethane dispersions,
   wherein the least two aqueous polyurethane dispersions are the reaction products of reactants comprising:
   (i) a polyisocyanate;
   (ii) a polyester polyol having a number average molecular weight of 400 to 8,000 g/mol;
   (iii) a compound comprising at least one isocyanate-reactive group and an anionic group or potentially anionic group;
   (iv) a mono functional polyalkylene ether;
   (v) a polyol having a molecular weight of less than <400 g/mol, and
   (vi) a polyamine or amino alcohol having a molecular weight of from 32 to 400 g/mol,
   wherein the at least two aqueous polyurethane dispersions comprise:
   (A) an anionic/non-ionic polyester polyurethane comprising a reaction product of (i), (ii), (iii), (iv), and (vi),
   wherein the at least two aqueous polyurethane dispersions further comprises:
   (B) an anionic aliphatic polyester-polyurethane comprising a reaction product of (i), (ii), (iii), (v), and (vi), wherein (ii) comprises a polyester polyol, and
   wherein the weight ratio of (A) to (B) in the composition is at least 1:1.

2. The composition of claim 1, wherein the aqueous polyurethane dispersion mixture forms a film exhibiting:
   (a) a microhardness of no more than 15 N/mm$^2$,
   (b) a glass transition temperature, $T_g$ of −54° C. to −35° C.,
   (c) a percent elongation of 250 to 700, and
   (d) a tensile strength of 130 lb/in$^2$ to 1000 lb/in$^2$.

3. The composition of claim 1, wherein the polyester polyol comprises a polyester diol comprising a reaction product of butanediol, neopentyl glycol, and/or hexanediol, with adipic acid.

4. The composition of claim 1, wherein (iv) comprises a copolymer of ethylene oxide with propylene oxide that contains ethylene oxide in an amount of 40% to 80% by weight, based on the total weight of ethylene oxide and propylene oxide.

5. The composition of claim 1, wherein the aqueous polyurethane dispersion mixture is present in the treatment composition in an amount such that the total amount of polyurethane that is present in the treatment composition is 1% to 20%.

6. The composition of claim 1, wherein the one or more of insecticides, fungicides, nematicides and/or other pesticides comprises acetamiprid, clothianidin, dinotefuran, imidacloprid, nitenpyram, thiacloprid, thiamethoxam, and/or abamectin.

7. The composition of claim 6, wherein the one or more of insecticides, fungicides, nematicides and/or other pesticides is present in the treatment compositions in an amount of about 15% by weight to about 60% by weight.

8. The composition of claim 1, further comprising a polyethylene wax.

9. A method of coating a seed comprising applying the composition of claim 1 to the seed.

10. The method of claim 9, wherein the seed comprises corn seed.

11. A seed treated by the method of claim 9.

* * * * *